Sept. 4, 1962 F. E. HARWOOD ET AL 3,052,402

RECORDING APPARATUS

Filed July 30, 1957 9 Sheets-Sheet 1

INVENTORS

FLOYD E. HARWOOD AND
RODNEY R. MAST by Mason, Kolehmainen, Rathburn and Wyss.

ATTORNEYS

Sept. 4, 1962 F. E. HARWOOD ET AL 3,052,402

RECORDING APPARATUS

Filed July 30, 1957 9 Sheets-Sheet 3

INVENTORS

FLOYD E. HARWOOD AND RODNEY R. MAST by Mason, Kolehmainen, Rathburn and Wyss.

ATTORNEYS.

INVENTORS
FLOYD E. HARWOOD AND
RODNEY R. MAST
by Mason, Kolehmainen, Rathburn and Wyss.
ATTORNEYS.

INVENTORS
FLOYD E. HARWOOD AND
RODNEY R. MAST
by
Mason, Kolehmainen, Rathburn and Wyss
ATTORNEYS.

INVENTORS
FLOYD E. HARWOOD AND
RODNEY R. MAST
by
Mason, Kolehmainen, Rathburn and Wyss.
ATTORNEYS Sept. 4, 1962 F. E. HARWOOD ET AL 3,052,402

RECORDING APPARATUS

Filed July 30, 1957

9 Sheets-Sheet 7

RECORDING APPARATUS

Filed July 30, 1957 9 Sheets-Sheet 9

United States Patent Office 3,052,402
Patented Sept. 4, 1962

3,052,402
RECORDING APPARATUS

Floyd E. Harwood and Rodney R. Mast, Ypsilanti, Mich., assignors to Parsons Corporation, Traverse City, Mich., a corporation of Michigan Filed July 30, 1957, Ser. No. 675,148
8 Claims. (Cl. 234—128)

This application relates to a recorder mechanism and, more particularly, to a new and improved punching apparatus including means for feeding a record medium.

In the copending application of John T. Parsons and Floyd E. Harwood, Serial No. 674,131, filed July 25, 1957, now Patent No. 3,001,693, which aplication is assigned to the same assignee as the present application, there is disclosed a data handling system for automatically punching an employee badge number on a card in conjunction with data representing instant date and time. This data handling system is adapted for use at plant gates, within a factory, at various points along a production line, or at other locations where it is desirable to automatically produce a primary or source record, such as a sales slip including the identification of an entity, such as a purchaser, and other related data items like the cost and designation of a purchased article. Consequently, it is desirable for the recorder or punching apparatus to be as small and compact as possible to permit it to be easily and inconspicuously mounted. It is also desirable to be able to quickly fabricate this punching assembly at a low cost.

Accordingly, one object of the present invention is to provide a new and improved recorder assembly.

Another object is to provide a new and improved apparatus for selectively punching a record medium.

A further object is to provide a new and improved mechanism for feeding a record medium to a perforating apparatus.

Another object is to provide a punching apparatus including means for feeding a card step-by-step in synchronism with the operation of selectively controlled card punching means.

A further object is to provide means for feeding a record element to a punching position including a new and improved record intercepting gate assembly.

Another object is to provide a new and improved card punching apparatus of the type using a plurality of selectively operated interposer elements.

Another object is to provide an apparatus for punching a record medium including a medium feeding means having a plurality of spaced and sequentially operable medium drive assemblies.

In accordance with these and many other objects of the present invention, an embodiment thereof comprises a combined employee identification and time recording unit which is selectively controlled by a badge, check or key having indicia thereon representing the designation or identification of the employee. The unit further includes a plurality of serially connected and automatically adjusted stepping switches forming a timing circuit which provides signals representing instant date and time. To record the signals provided by the timing circuit and by a sensing unit controlled by an inserted key, the unit includes a selectively operated punching device for perforating spaced data entries on a blank record card.

When a card is inserted into the recorder unit, a card feeding drive assembly comprising a continuously driven wheel and a shiftable idler roller is rendered effective by shifting the roller into engagement with the card to bias it against the driven wheel so that the card is rapidly advanced to a gate assembly disposed on a punch guiding frame. With the blank card in engagement with the gate assembly, the card is in position for receiving the perforations forming the first data item to be recorded. The card feeding assembly is then rendered ineffective by moving the idler roller out of engagement with the card, and the gate assembly is operated to displace the gate element so that the card can be advanced step-by-step in synchronism with the operation of a commutator which sequentially renders the various signal sources effective to control the punching means.

The punching means comprises ten interposer solenoids secured to a movable punch supporting frame and ten punch elements which are movably supported on the frame and which are selectively rendered effective to perforate the card in accordance with the operated one of the interposer solenoids. The punch supporting frame is reciprocated once for each step of operation of a card indexing drive assembly, which includes a shiftable idler roller and a drive wheel advanced by a Geneva movement, so that the card is advanced following each perforating operation. Similarly, the commutator is advanced a single step incident to each card feeding and punching operation to render the next signal source effective. At the completion of the perforating operation, the indexing drive assembly is rendered ineffective and a card ejecting drive assembly comprising a continuously driven card engaging wheel and a shiftable idler roller is placed in operation to eject the card from the recorder unit, thereby providing a primary or source record in a form suitable for use in automatic tabulating equipment.

Many other objects and advantages of the present invention will become apparent from a consideration of the following description thereof when taken in conjunction with the drawings wherein:

FIG. 14 is a block diagram illustrating the manner in which FIGS. 11–13 are positioned adjacent each other to form a complete circuit diagram;

Figure 1:
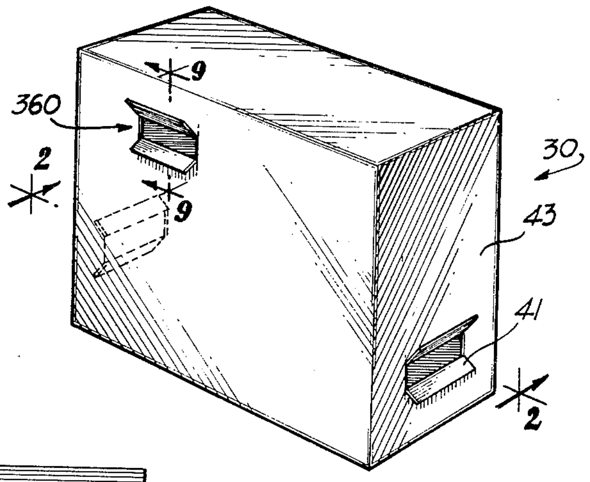
FIG. 1 is a perspective view of the badge or key controlled time recorder unit.
Figure 2:
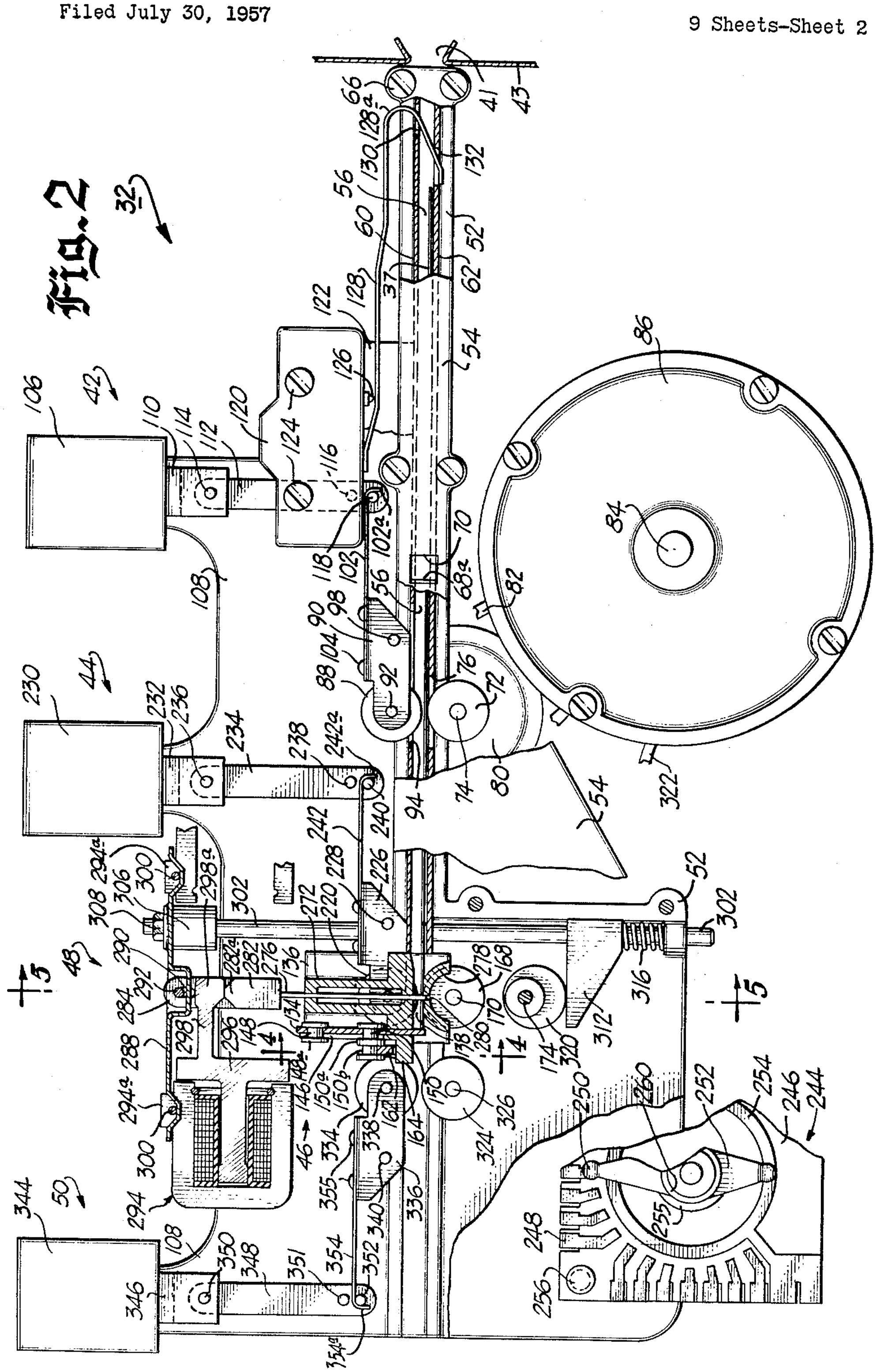
FIG. 2 is an enlarged fragmentary cross-sectional view taken along line 2—2 in FIG. 1 showing the card transporting and punching apparatus of the present invention.
Figure 9:
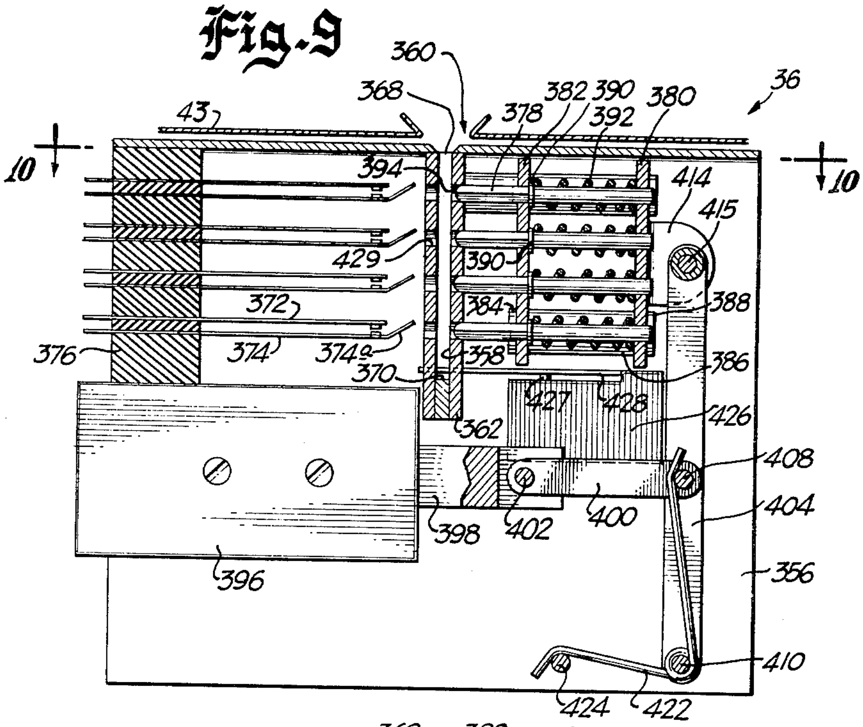
FIG. 9 is a sectional view taken along line 9—9 in FIG. 1 showing a badge or key sensing device.
Figure 10:
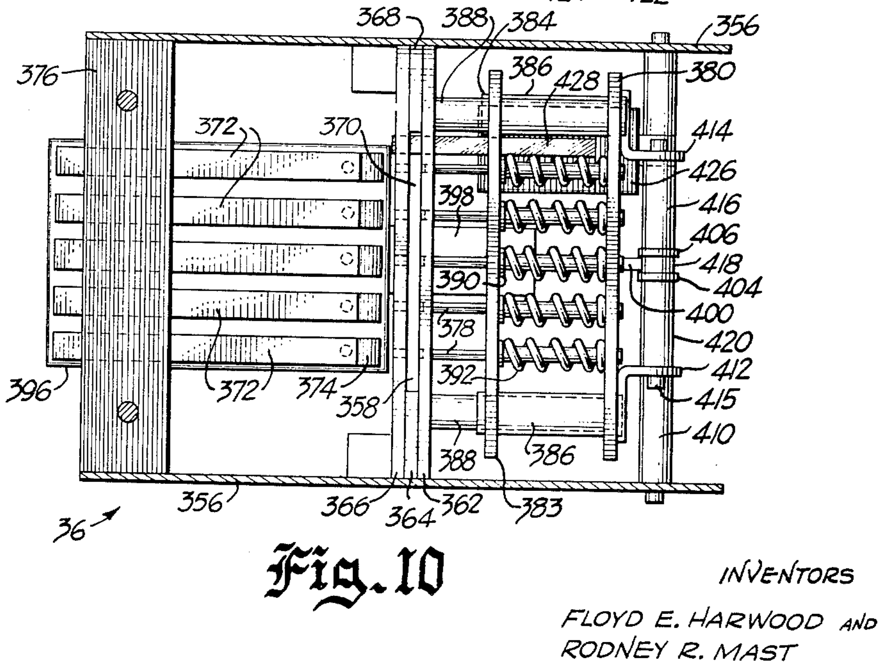
FIG. 10 is a sectional view taken along line 10—10 in FIG. 9, assuming that the entire sensing device is shown therein.
Figure 11:
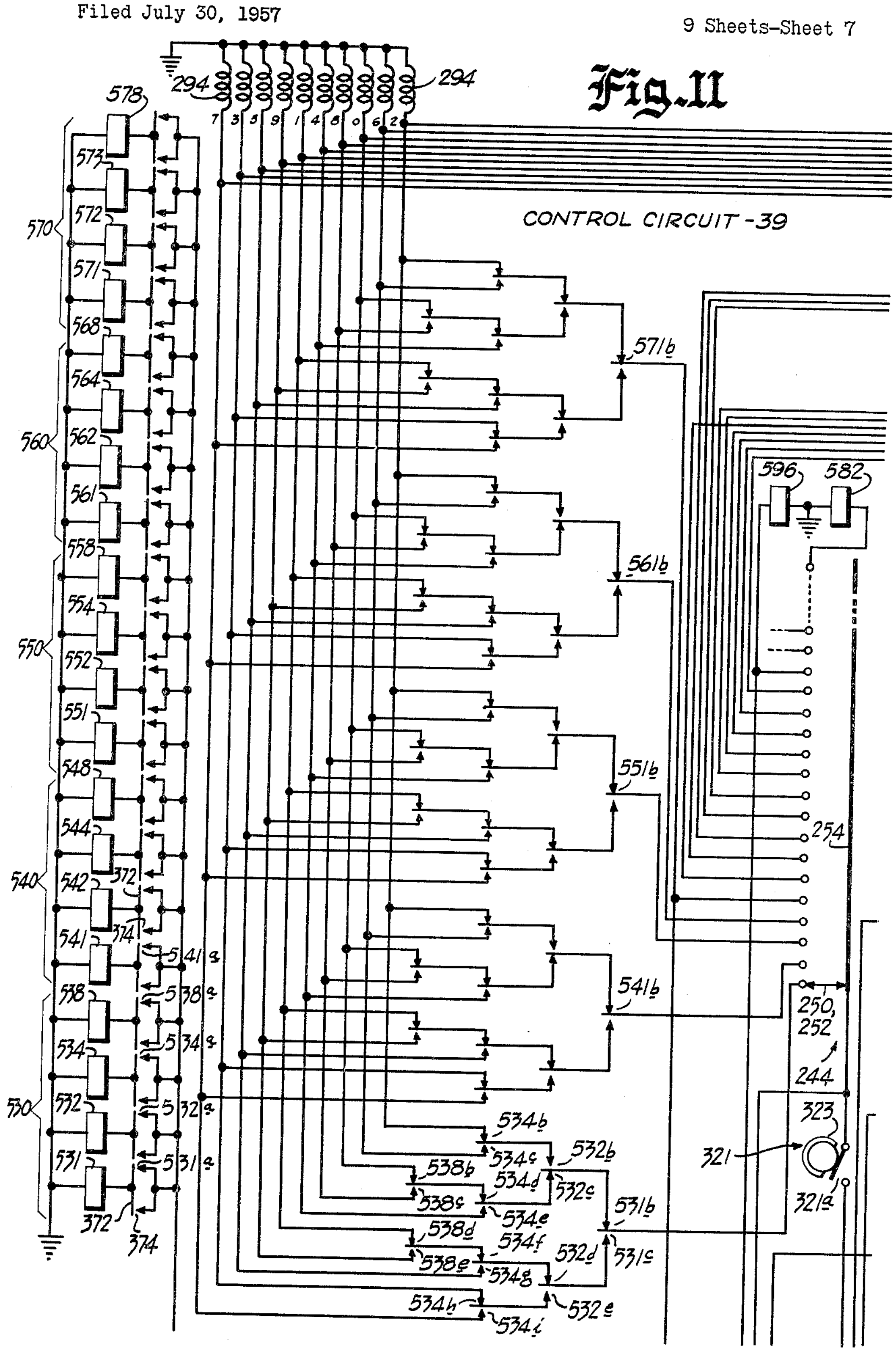
FIGS. 11, 12 and 13 are schematic circuit diagrams of a control and timing circuit for the key controlled recorder unit.

Referring now to the drawings, a key or check controlled time recorder unit, indicated generally as 30 (FIG. 1), embodying the present invention includes a card punching and feeding apparatus 32 (FIG. 2) which is selectively supplied with date and time information by a timing circuit 34 (FIG. 12) and with information relating to the badge number or employee designation by a sensing unit 36 (FIGS. 9 and 10) under the control of a control circuit 39 (FIGS. 11 and 13) so that this information is punched into a record card 37 (FIG. 2). In order to provide the date and time information, the timing circuit 34 includes a group of stepping switches operable to settings representing tens and units days, tens and units hours, and tenths and hundredths of an hour. The timing circuit 34 further includes a group of switches manually adjustable to positions representing a digital designation of year and month.

Figure 17:
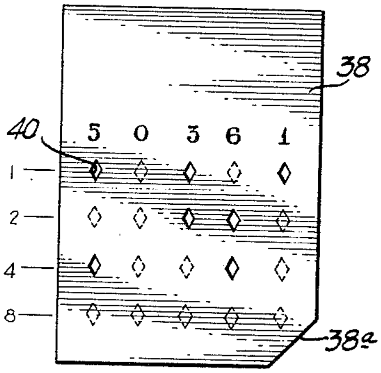
FIG. 17 is a plan view of a badge or key containing perforations representing an employee's badge number or other identification.
Figure 14:
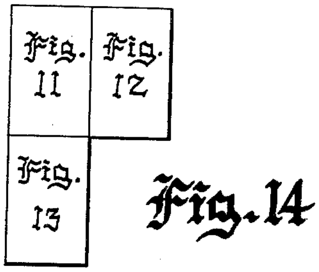

To provide information relating to the designation of the employee, a badge 38 is provided having suitable indicia thereon representing the badge number or other designation of the employee. As illustrated in FIG. 17 of the drawings, the badge 38 includes five vertically extending rows which are selectively provided with one or more perforations 40 in accordance with the binary designation of the five digits comprising the badge number of the employee. The badge 38 illustrated in FIG. 17 includes a plurality of diamond shaped perforations 40 representing a badge number "50361"; but it is obvious that a greater or lesser number of vertically extending rows of perforations 40 can be provided in accordance with the number of digits comprising the employee's badge number. Further, although diamond shaped perforations are illustrated in FIG. 17 because of the difficulty of duplicating this type of perforation, it is obvious that perforations of other configurations and, in fact, indicia of many different types could be applied to the badge 38 as a means for providing a representation of the identification of the employee.

All of the employees in a given location, company or plant are provided with keys, checks, or badges 38, each of which is provided with a plurality of differently located perforations 40 representing the badge number or other numerical identification of the employee. Therefore, whenever a primary or source record such as a time card or a production control card is required, the badge 38 can be inserted into the sensing unit 36 of the recorder 30 to provide this recorder unit with the identification information which is recorded in conjunction with a variable item of information, such as the instant date and time information provided by the timing circuit 34. Since the identification information is derived from sensing the indicia on the badge or check 38, the possibility of error inherent in transcribing identification information from longhand notations is avoided, and the actual time consumed in originally entering the identification information is materially reduced.

In addition to the insertion of the key 38 into the sensing unit 36, a cycle of operation of the recorder unit 30 cannot be initiated unless a record card 37 is supplied to the card feeding and punching apparatus 32. More specifically, when a card 37 is inserted into a card feed opening 41 (FIG. 1) in a housing 43 for the recorder unit 30 and a badge 38 is inserted into the sensing unit 36, the control circuit 39 (FIGS. 11 and 13) operates the sensing device 36 so that the coded identification of the employee is stored in a plurality of register relays in the circuit 39. This circuit also places a card feeding assembly 42 (FIG. 2) in operation so that the card 37 is quickly advanced to a position determined by a gate assembly 46 in which it is suitably located within a punching assembly 48. The control circuit 39 then renders the card feeding assembly 42 ineffective and operates the gate assembly 46 to a displaced position so that the card 37 can be further advanced. A commutator in the control circuit 39 is now placed in operation to sequentially supply employee identification data from the register relays and date and time information from the timing circuit 34 to the punching assembly 48 so that this information is perforated in successive columns of the card 37. The card 37 is advanced step-by-step during these punching operations by an indexing drive assembly 44 which operates in synchronism with the actuation of the punching assembly 48. Following the perforation of the employee and date and time information, the commutator in the control circuit 39 renders a manually controlled keyboard mechanism effective to control the recording of selected data on the card 37. At the end of the cycle of operation of the commutator, the control circuit 39 renders the indexing drive assembly 44 and the punching assembly 48 ineffective, operates the card ejecting assembly 50 to eject the punched card 37 from the recorder unit 30, and restores the gate assembly 46 to its card intercepting position.

Upon ejection, the card 37 includes perforations representing the designation or identification of the employee, as determined by the coded perforations on the key 38, the instant date and time data determined by the settings of the timing circuit 34, and any other items which have been entered by the manual operation of the keyboard. In this manner, a primary or source record, such as a time card or a production control card, is provided in a form suitable for use in automatic tabulating or accounting equipment without the necessity of an intervening step in which the originally entered data is translated into a physical form and a system of notation compatible with the tabulating apparatus.

Figure 3:
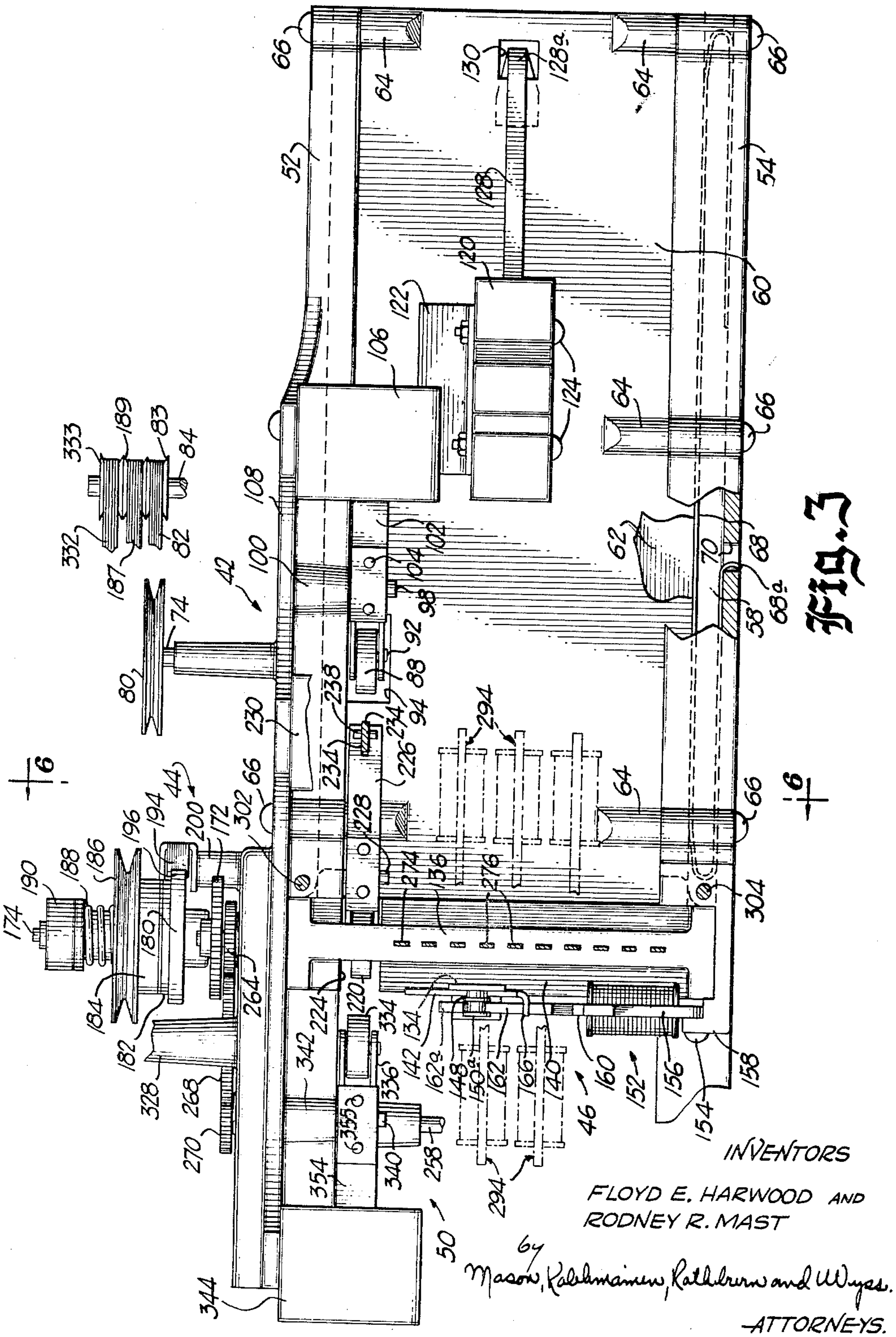
FIG. 3 is a top elevational view of the apparatus illustrated in FIG. 2, assuming that the entire structure is disclosed therein, with portions of the punching apparatus removed.
Figures 6, 7, 8:
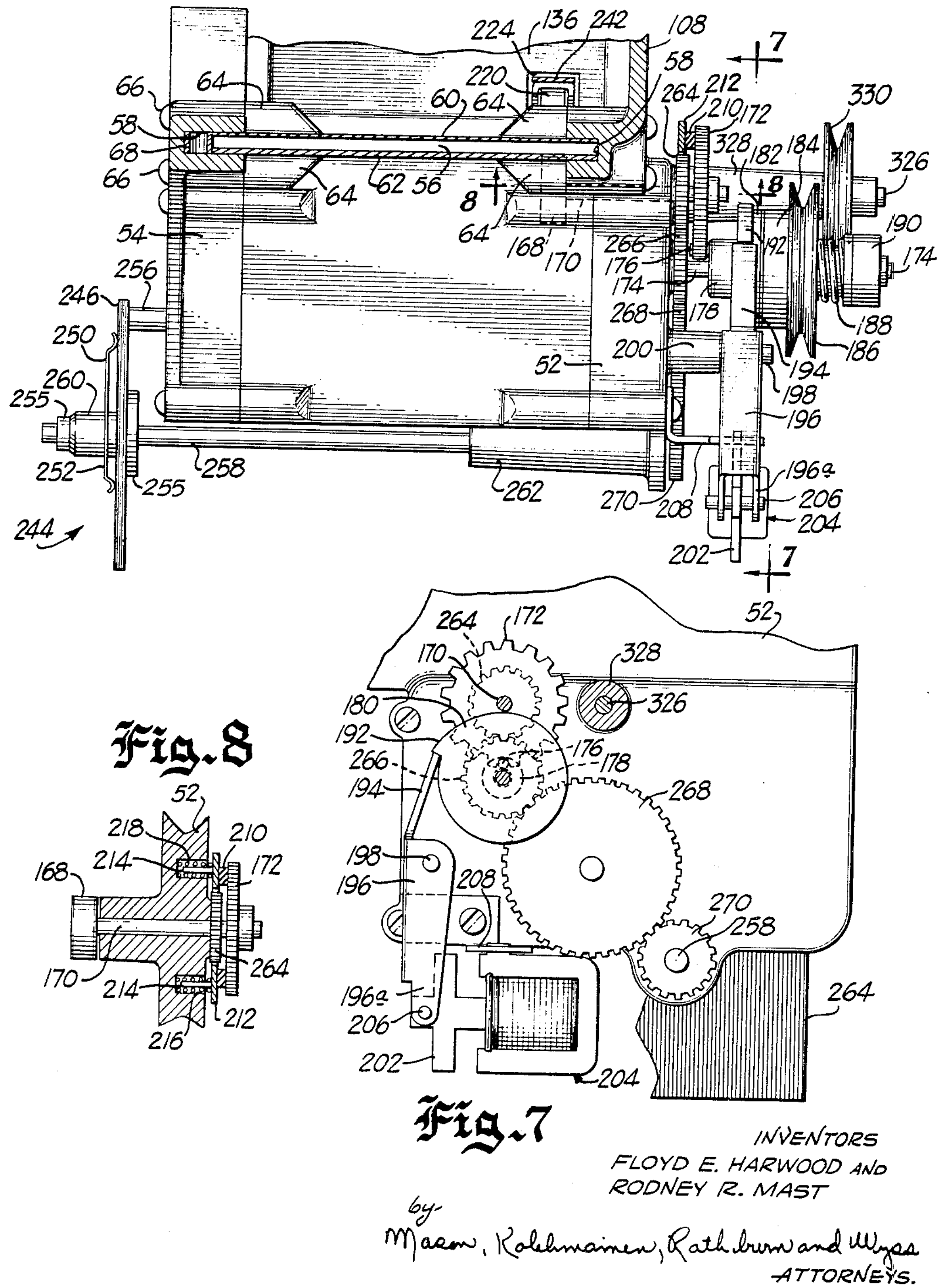
FIG. 6 is a fragmentary sectional view taken along line 6—6 in FIG. 3 which illustrates a portion of a card indexing drive assembly.
FIG. 7 is a sectional view taken along line 7—7 in FIG. 6.
FIG. 8 is a fragmentary sectional view taken along line 8—8 in FIG. 6.

Referring now to the card punching and feeding apparatus 32 (FIGS. 2 and 3), this apparatus includes a pair of side frame members 52 and 54 providing a base structure on which the various card punching and feeding assemblies are mounted. To provide a card guideway or channel 56 into which the card 37 is manually inserted and through which the card is successively advanced by the drive assemblies 42, 44 and 50 during the card punching operation, each of the side frame members 52 and 54 is provided with a slot or groove 58 (FIG. 6). A channel top plate 60 and a channel bottom plate 62 are disposed between the side frame members 52 and 54 with the end portions thereof disposed adjacent the side walls of the grooves 58. The upper surface of the top plate 60 is provided with a plurality of pairs of longitudinally spaced bossed portions 64 (FIG. 3) adjacent each of the side frame members 52 and 54, and the bottom plate 62 is provided with a plurality of similarly positioned bossed portions (not shown). A plurality of machine screws 66 carried on the side frames 52 and 54 are threadedly received within the bossed portions 64 to secure the top and bottom plates 60 and 62 of the channel 56 to the side frame members 52 and 54 and also to secure the side frame members 52 and 54 to each other. To provide a means for resiliently urging one edge of the card 37 into engagement with the frame member 52 during the card feeding operation, a doubly reentrant flat spring 68 is disposed within the groove 58 in the frame element 54 and is located therein by an outwardly turned end portion 68*a* which is received within an opening 70 formed in the side wall of the frame member 54.

The card feeding drive assembly 42 (FIGS. 2 and 3) is operative to advance the card 37 following its insertion into the channel 56 to a position determined by the stop assembly 46 at which the card 37 is properly located to permit the initiation of the punching operation by the assembly 48. To this end, the assembly 42 includes a driven wheel 72 which is rotatably mounted on the frame member 52 by a shaft 74 and which extends upwardly into the card channel or guideway 56 through an opening 76 in the bottom plate 62. The wheel 72 is driven by a belt 82 passing around a pulley 80 secured to an outer end of the shaft 74 and an aligned pulley 83 on a shaft 84 of a common drive motor 86.

To provide a means for resiliently biasing the card 37 into engagement with the driven wheel 72 when the drive 42 is rendered effective, an idler roller 88 is provided which is mounted between the bifurcated end of a substantially U-shaped bracket 90 by a pin 92. The idler roller 88 extends downwardly into the channel 56 through an elongated opening 94 formed in the top plate 60. The U-shaped bracket 90 is pivotally mounted on the side frame member 52 by a shaft 98 which is secured to a rounded supporting portion 100 formed integral with the side frame 52.

To provide a means for selectively moving the idler roller 88 toward the driven wheel 72 and for resiliently biasing the interposed card 37 toward the drive wheel 72, a flat spring 102 is connected to the bight portion of the bracket 90 by a plurality of suitable fasteners 104. The flat spring 102 resiliently interconnects the bracket 90 with a solenoid 106 which is secured to an upstanding portion 108 of the side frame 52 and which is selectively operated and released to move the idler 88 into and out of engagement with the card 37. The solenoid 106 includes an armature 110 having a bifurcated end portion within which one end of a link 112 is pivotally mounted by a pin 114. The lower end of the link 112 carries a pair of vertically spaced projecting pins 116 and 118 between which is disposed an offset end portion 102*a* of the flat spring 102. When the solenoid 106 is energized to elevate the link 112, as viewed in FIG. 2, the pin 118 bears against the spring 102 to resiliently bias the bracket 90 for pivotal movement in a counterclockwise direction, thereby moving the idler roller 88 toward the driven wheel 72 with the card 37 interposed therebetween. This places the card 37 in driving engagement with the wheel 72 so that it is rapidly adavanced to the position at which punching is to be initiated, as determined by the gate assembly 46. When the solenoid 106 is released, downward movement of the armature 110 moves the pin 116 into engagement with the flat spring 102 so as to bias the bracket 90 for pivotal movement in a clockwise direction, thereby lifting the idler roller 88 out of engagement with the card 37.

To provide means for initiating operation of the card feeding drive assembly 42 when the card 37 is inserted into the channel 56 and for interrupting operation of the assembly 42 when this card has been moved to the position determined by the gate assembly 46, a switch 120 is provided. This switch is secured to an upstanding arm of a bracket 122, which is supported on the plate 60, by a plurality of suitable fasteners 124. The switch 120 is selectively operated by a resilient arm 128, one end of which is secured to the switch 120 adjacent an operating plunger 126 therefor. A curved free ends 128*a* of the arm 128 extends downwardly into the card guideway 56 through an opening 130 in the top plate 60 and extends out of the channel 56 through an opening 132 in the bottom plate 62.

When a card 37 is inserted into the channel 56, the leading edge thereof engages and cams upwardly the reentrant end portion 128*a* of the resilient arm 128, thereby deflecting this arm in a counterclockwise direction so that the operating plunger 126 of the switch 120 is engaged and moved to operate this switch. The operation of the switch 120 operates the solenoid 106 so that the card feeding assembly 42 is rendered effective to advance the card 37 to the position illustrated in FIG. 2 determined by the stop assembly 46. In this position, the trailing edge of the card 37 moves out of engagement with the end portion 128*a* of the arm 128, thereby permitting it to return to the position illustrated in FIG. 2 in which the switch 120 and the solenoid 106 are released to terminate operation of the drive assembly 42.

Referring now to the stop or gate assembly 46 (FIGS. 2, 3 and 4), this assembly arrests the movement of the card 37 by the card feeding drive assembly 42 and is then rendered ineffective so as to permit the card 37 to be subsequently advanced step-by-step by the indexing drive assembly 44 during perforation thereof by the punch assembly 48. The stop assembly 46 includes a gate element 134 movably mounted on a punch guiding frame member 136 so as normally to extend across a card receiving passageway 138 defined by the frame 136. In this card intercepting position, the gate 134 engages the end of the card 37, as illustrated in FIG. 2, to prevent movement of the card beyond this point under the control of the card feeding drive assembly 42. The gate 134 is slidably mounted in a recess formed in a flanged portion 140 of the frame 136 and is slidably secured therein by a cover plate 142 which is secured to the flange 140 by a plurality of suitable fasteners 144. To guide movement of the gate element 134 relative to the cover plate 142, this latter member is provided with a vertically extending slot 146 in which are slidably received a pair of vertically spaced fasteners 148 and 150 having enlarged head or collar portions 148*a* and 150*a* in sliding engagement with the upper surface of the cover plate 142. To provide means for selectively operating the gate assembly 46, a solenoid 152 is provided which preferably is of the type disclosed in the copending application of Floyd E. Harwood, Serial No. 660,201, filed May 20, 1957, which application is assigned to the same assignee as the present invention. The solenoid 152 is secured to an offset lug 154 formed integral with the frame member 54 by a machine screw 158 which is threadedly received within an aperture formed in a field structure 156 of the solenoid 152. The solenoid 152 also includes an armature 160 having an arm 162 with an enlarged end portion 162*a* which is slidably mounted on a projecting tab 164 formed integral with the cover plate 142. Suitable biasing means (not shown) normally hold the armature 160 in the position shown in FIG. 4 in which an edge of the armature 160 engages a stop lug 166 formed integral with and projecting outwardly from the cover plate 142. In this position, the reduced width portion of the arm 162 is in engagement with a cam follower portion 150*b* on the fastener 150.

Figure 4:
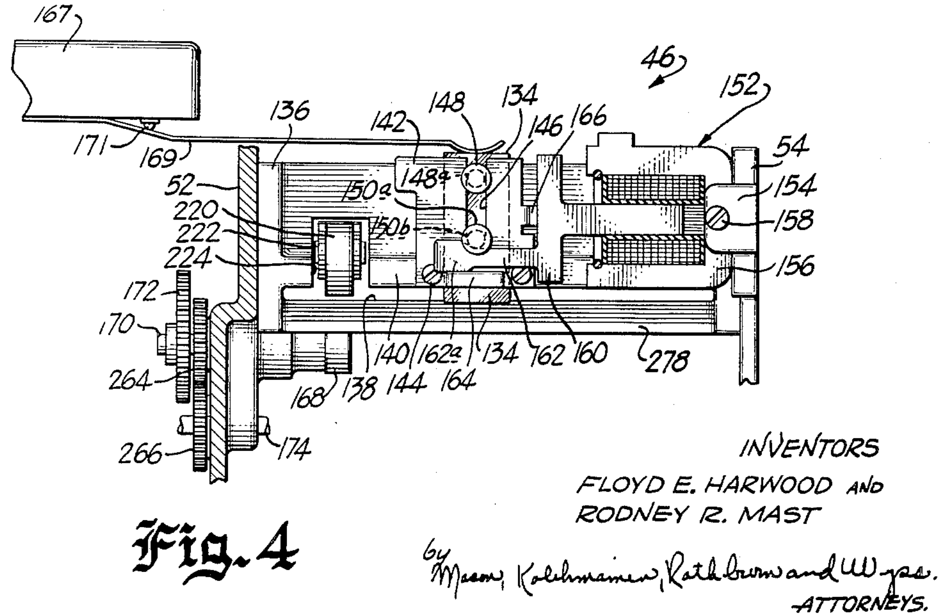
FIG. 4 is a fragmentary sectional view taken along line 4—4 in FIG. 2, again assuming that the complete apparatus is shown therein.

After the card 37 has been advanced into engagement with the gate element 134, the switch 120 has been released, and the badge 38 has been inserted into the sensing unit 36, the control circuit 39 energizes the solenoid 152 to move the armature 160 to the right, as viewed in FIG. 4, against the biasing means so that the enlarged portion 162*a* cams against the follower portion 150*b* of the fastener element 150. This camming movement slides the gate element 134 upwardly to a position in which it no longer extends across the passageway 138 in the punch guiding frame 136, thus permitting the card 37 to be indexed step-by-step under the control of the indexing drive assembly 44. When the solenoid 152 is released at the end of the punching operation, the armature 160 is moved to the left by the biasing means into engagement with the stop lug 166 so that the enlarged portion 162*a* moves out of alignment with the follower portion 150*b*. This permits the gate element 134 to be returned to the card intercepting position illustrated in FIG. 4 as soon as the punched card 37 is ejected by the assembly 50.

To provide information to the control circuit 39 indicating that the card 37 has been ejected by the card ejecting assembly 50, the stop assembly 46 includes a switch 167 (FIG. 4) which is suitably mounted on the base structure. One end of a resilient operating arm 169 is connected to the switch 167 adjacent an operating plunger 171 therefor, and the other end of the arm 169 bears against the upper end of the gate element 134. When this gate is elevated, the switch 167 is operated by the deflection of the arm 169, and, when the gate solenoid 152 is released, the resilient arm 169 biases the gate element 134 downwardly so that the lower end of the gate element bears against the upper surface of the card 37. As soon as the trailing edge of the card 37 clears the perforating or punching assembly 48, the gate element 134 moves further downwardly to its card intercepting position and thus releases the gate switch 167 to indicate the completion of the ejection of the perforated card 37.

Following the operation of the stop or gate assembly 46 to permit the card 37 to be advanced, the indexing drive assembly 44 (FIGS. 2 and 5–8) is placed in operation by the control circuit 39. The indexing drive assembly 44 is synchronized with the intermittent actuation of the punching assembly 48 so that the card 37 is advanced a single step in response to each operation of the assembly 48. The indexing assembly 44 includes a card engaging drive wheel 168 connected to a shaft 170 which is rotatably mounted on the side frame member 52. To drive the wheel 168 through short predetermined increments of angular movement, a Geneva mechanism including a gear 172 secured to the shaft 170 is provided. The gear 172 is engaged and rotated through a short angular increment during each cycle of rotation of a control shaft 174 by a single tooth gear comprising a pin 176 carried on a hub 178 which is secured to the shaft 174. A control cam 180 formed integral with the hub 178 supports a first annular friction clutch member 182. A second friction clutch element 184 concentrically disposed on the shaft 174 adjacent the first clutch element 182 is connected to a pulley 186 which is rotatably mounted on the shaft 174. A coil spring 188 interposed between a collar 190 secured to the outer end of the shaft 174 bears against the pulley 186 to force the clutch member 184 into engagement with the clutch element 182. The pulley 186 is driven by a crossed belt 187 which also passes around a pulley 189 on the motor shaft 34.

Rotation of the control shaft 174 is normally prevented by the engagement of a shoulder 192 on the cam 180 by a detent arm 194 forming a part of a substantially U-shaped armature 196. This armature is pivotally mounted on the side frame 52 by a stub shaft 198 carried on a projecting portion 200 formed integral with the side frame 52. A bifurcated end portion 196*a* of the bracket 196 is connected to an armature 202 of a solenoid 204, which is of the same type as that disclosed in the above identified Harwood application, by a pivot pin 206. The solenoid 204 is mounted on the frame member 52 by a bracket 208.

When the solenoid 204 is energized by the control circuit 39 to retract the armature 202, the bracket 196 is pivoted in a counterclockwise direction, as viewed in FIG. 7, to move the detent arm 194 out of engagement with the shoulder 192, thereby releasing the control cam 180. The second clutch element 184 which is connected to the pulley 186 normally slips relative to the first clutch element 182 which is connected to the control cam 180. However, when the detent arm 194 is moved out of engagement with the shoulder 192, the slippage between the clutch elements 182 and 184 ends, and the control shaft 174, the cam 180, and the hub 178 with the pin 176 are placed in rotation. During each cycle of this rotation, the pin 176 moves into and out of engagement with the teeth on the gear 172 so that the shaft 170 and the wheel 168 connected thereto are rotated through a fixed increment of angular movement to advance the card 37 a single step.

To provide a brake for arresting overtravel of the drive wheel 168, the inner surface of the gear 172 is provided with annular pad 210 of frictional material. A somewhat U-shaped plate 212 is provided with a plurality of legs 214 individually extending into a plurality of openings 216 formed in the outer surface of the frame 52. A coil spring 218 encircling each of the legs 214 is interposed between the bottom of the opening 216 and the inner surface of the U-shaped plate 212, thereby to bias the plate 212 into engagement with the annular ring 210. The frictional engagement between the plate 212 and the ring 210 serves to arrest movement of the gear 172, the shaft 170 and the wheel 168, thereby to prevent overtravel of these components when the pin 176 moves out of engagement with the teeth of the gear 172.

To provide a means for selectively rendering incremental rotation of the wheel 168 effective to advance the card 37, the indexing drive assembly 44 includes an idler roller 220 which is rotatably mounted on a shaft 222 within a recessed portion 224 of the punch guiding frame 136 in alignment with the driving wheel 168. The shaft or pin 222 rotatably mounts the idler roller 220 between the bifurcated ends of a substantially U-shaped bracket 226 which is pivotally mounted on the frame member 52 by a stub shaft 228. The position of the bracket 226 and, accordingly, that of the idler 220 is controlled by a solenoid 230 (FIG. 2) which is operated at the beginning of the punching operation so as to move its armature 232 upwardly. One end of a link 234 is pivotally connected within the bifurcated end of the armature 232 by a pivot pin 236 and the lower end of the link 234 is provided with a pair of vertically spaced pins 238 and 240. One end of a flat spring 242 is secured to the bight portion of the U-shaped bracket 226, and the other end is provided with a downwardly turned portion 242*a* which engages the pin 240. Accordingly, when the solenoid 230 is operated to retract its armature 232, the link 234 is moved upwardly, as viewed in FIG. 2, to resiliently bias the bracket 226 for pivotal movement in a counterclockwise direction, thereby biasing the idler roller 220 toward the driving wheel 168 with the card 37 interposed therebetween. By virtue of the flat spring 242, the idler 220 is resiliently biased toward and held in engagement with the card 37 so that the step-by-step movements of the wheel 168 advance the card 37.

The indexing drive 44, in addition to including means for advancing the card 37 a single step incident to each operation of the punching assembly 48, also includes means for advancing a commutator 244 (FIGS. 2 and 6) a single step in synchronism with each step of movement of the wheel 168. The commutator 244 consists of a dielectric base plate 246 on which is formed, preferably by conventional printed circuit techniques, a plurality of individual conductive segments 248, each of which is adapted to be engaged in sequence by a wiper 250. The wiper 250 is electrically connected to and preferably formed integral with a second wiper 252 which is adapted to engage a common conductive ring 254, whereby the wipers 250 and 252 provide means for sequentially connecting the common conductive ring 254 to each of the individual commutator segments 248. The dielectric base plate 246 is rotatably mounted on a dielectric bushing 255 which is connected to a shaft 258, and the wipers 250 and 252, which are keyed to the bushing 255, are biased toward the plate 246 by a dielectric bushing assembly 260 which is carried on the bushing 255. The plate 246 is held against rotation with the shaft 258 and the bushing 255 by a pin 256 which connects this plate to the frame member 54. The shaft 258 is rotatably mounted on the frame member 52 by a bossed portion 262.

To drive the shaft 258 step-by-step in synchronism with the step-by-step rotation of the wheel 168, a gear 264 (FIGS. 6–8) secured to the shaft 170 is disposed between the frame 52 and the gear 172 to be partially encircled by the U-shaped plate 212. The gear 264 meshes with a gear 266 which is rotatably mounted on the shaft 174, and the gear 266 meshes with a gear 268 which is also rotatably mounted on the frame member 52. The gear 268 meshes with a gear 270 which is connected to the end of the shaft 258. The gear train including the gears 264, 266, 268 and 270 is such that, each time the gear 172 is moved through a short increment of angular movement by engagement with the pin 176, this gear train rotates the shaft 258 to move the wiper 250 out of engagement with one of the commutator segments 248 and into engagement with the next adjacent commutator segment. Thus, the operation of the commutator 244 is synchronized with the step-by-step movement of the card 37.

The punching assembly 48 (FIGS. 2, 3 and 5), which is operative to punch a record of the employee identification and the time data supplied by the sensing unit 36 and the timing circuit 34 in synchronism with the step-by-step advancement of the card 37 under the control of the driving assembly 44, includes the punch guiding frame 136 which is disposed between and secured to the side frame members 52 and 54. A centrally disposed and upwardly extending portion 272 of the frame 136 includes ten transversely spaced apertures 274 for slidably receiving ten identical punch elements 276, the lower ends of which extend outwardly from the guiding frame 136 through apertures similar to the openings 274 to be disposed slightly above the upper surface of the card 37 in punching position. The frame 136 further includes a semi-circular portion 278 having a flattened top surface for guiding movement of the card 37 in which ten spaced die openings 280 are provided in alignment with the punch elements 276. The upper ends of the ten punch elements 276 are secured to ten nylon supporting elements 282, each of which is provided with a shouldered portion 282*a* and a narrow portion 284 which extends upwardly through an aligned opening 286 in a punch supporting frame 288. Each of the narrow portions 284 is provided with an elongated slot 290 through which extends a rod 292, the ends of which are secured to the frame 288. To provide electrically controlled means for selectively rendering only one of the punches 276 or a combination thereof effective to perforate the card 37 upon actuation of the punching assembly 48, ten solenoid assemblies indicated generally as 294 are provided. These interposer solenoid assemblies preferably are of the type disclosed in detail in the above identified copending Harwood application. Each of the solenoid assemblies includes an armature structure 296 having a projecting arm 298 with an enlarged end portion 298*a*. The ten solenoids 294 are alternately mounted on opposite sides of the line of punches 276 with each of the armatures 296 in alignment with the shoulder 282*a* on one of the punch supports 282. The solenoids 294 are secured to the punch frame 288 by a pair of rods 300 which pass through lugs 294*a* formed integral with the field structures of the solenoids 294. Suitable resilient biasing means together with stop means (not shown) are provided for holding each of the armatures 296 with the narrow portion of the arm 298 disposed in alignment with the shoulder 282*a* on the related punch support 282. However, when one or more of the solenoids 294 is energized, its armature 296 is retracted to the position illustrated in FIG. 2 in which the enlarged portion 298*a* is interposed between the shoulder 282*a* on the related punch support 282 and adjacent lower surface of the punch supporting frame 288.

The frame 288 is movably supported on the side frame members 52 and 54 by a pair of pull down rods 302 and 304, each of which is provided with a rigidly connected collar 306 adjacent its upper end for engaging a lower surface of the punch supporting frame 288 and a nut 308 which holds the frame 288 in rigid engagement with the collar 306. The rods 302 and 304 are slidably mounted on the side frames 52 and 54, respectively, and are each provided with one of a pair of rigidly connected cam follower arms 312 and 314. A pair of compression springs 316 and 318 interposed between a pair of flanges formed on the frame members 52 and 54 and the lower surfaces of the cam followers 312 and 314 resiliently bias the punch supporting frame 288 upwardly.

Figure 5:
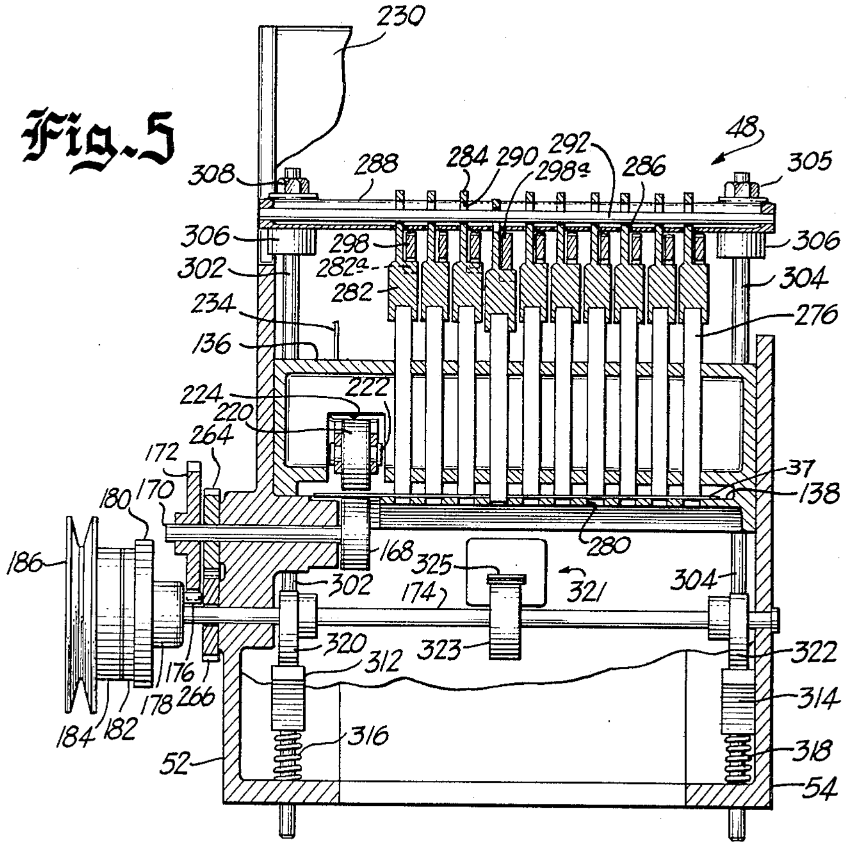
FIG. 5 is a sectional view taken along line 5—5 in FIG. 2, assuming that the entire mechanism is disclosed therein.

To provide means for operating the punching assembly 48 in synchronism with the step-by-step operation of the indexing assembly 44, the control shaft 174 is provided with a pair of cams 320 and 322 disposed adjacent the cam followers 312 and 314, respectively. As set forth above, when the clutch solenoid 204 is operated, the shaft 174 is placed in operation to advance both the card 37 and the commutator 244 step-by-step. During each cycle of rotation of the shaft 174, the cams 320 and 322 are rotated to move the cam followers 312 and 314 and consequently, the arms 302 and 304, downwardly (FIGS. 2 and 5). Downward movement of the pull down rods 302 and 304 moves the punch supporting frame 288 downwardly so that the punch elements 276 are all moved into engagement with the upper surface of the card 37. All of the punches 276 associated with solenoids 294 which are in a released condition remain ineffective to perforate the card 37 inasmuch as the engagement of the lower ends of these punches with the card 37 moves the related punch supports 282 upwardly relative to the support 288 by virtue of the sliding interconnection therebetween. However, the punch elements 276 associated with operated solenoids 294 are blocked from relative movement and are effective to perforate the card 37. As an illustration, when a solenoid 294 is operated to the position illustrated in FIGS. 2 and 5, the enlarged end portion 298*a* is interposed between the shoulder 282*a* of the support 282 and the frame 288. Accordingly, this support 282 is blocked against upward movement relative to the supporting frame 288 and the downward movement of this frame forces the blocked punch element 276 through the card 37 into the die openings 280 formed in the die member 278. In this manner, the card 37 is perforated in accordance with the selective operation of the ten controlling solenoids 294.

Continuing rotation of the shaft 174 moves the cams 320 and 322 relative to the cam followers 312 and 314 so that the rods 302 and 304 move upwardly under the control of the interposed compression springs 316 and 318, thereby returning the punch supporting frame 288 to its normal position in which effective punch element 276 is retracted from the aperture 280 in the die member 278. The downward movement of the punch supporting frame 288 under the control of the cams 320 and 322 is correlated with the step-by-step rotation of the wheel 168 so that the card 37 is not advanced during the interval in which the punches 276 are effective to perforate this card.

To provide a control signal for selectively operating the interposer solenoids 294 at a predetermined time in each punching cycle, the punching assembly 48 includes a switch 321 (FIG. 5) which is suitably mounted on the supporting frame and which is selectively operated by a cam 323 secured to the control shaft 174. A resilient operating arm 325 is secured at one end to the switch 321 and at its other end is resiliently biased into engagement with the outer periphery of the control cam 323. The control cam 323 is provided with a configuration such that, once during each cycle of revolution, the arm 325 is actuated to operate the switch 321, thereby to provide an operating signal to the interposer solenoids 294.

Following the completion of the perforating operation, the control circuit 39 releases the clutch solenoid 204 and the solenoid 230 to render the step-by-step drive assembly 44 ineffective, thereby freeing the card 37 for movement under the control of the ejecting drive assembly 50. The card ejecting assembly 50 (FIGS. 2, 3 and 6) includes a wheel 324 secured to a shaft 326 which is rotatably mounted on the side frame member 52 by a tubular projection 328 therefrom. The outer end of the shaft 326 is secured to a pulley 330 which is connected by a belt 332 to an aligned pulley 333 secured to the shaft 84 of the motor 86. Accordingly, the wheel 324 is continuously rotated following the energization of the drive motor 86 by the control circuit 39.

To provide means for selectively rendering the wheel 324 effective to eject the card 37, an idler roller 334 is provided which is disposed in alignment with the wheel 324 and which is rotatably mounted on a substantially U-shaped bracket 336 by a pivot pin 338. The U-shaped bracket 336 is pivotally mounted on the side frame member 52 by a stub shaft 340 secured to a projecting portion 342 on the side frame member 52. To provide means for shifting the position of the bracket 336, a solenoid 344 is provided having an armature 346 with a bifurcated end within which the upper end of a link 348 is secured by a pivot pin 350. The lower end of the link 348 is provided with a pair of spaced pins 351 and 352, the latter of which engages an offset end portion 354*a* of a flat spring 354, the other end of which is secured to the bight portion of the U-shaped bracket 336 by suitable fasteners 355. Accordingly, when the solenoid 344 is energized to retract the armature 346, the flexible spring 354 pivots the bracket 366 in a clockwise direction to move the idler roller 334 toward the driven wheel 324 with the card 37 disposed therebetween. Since the wheel or roller 324 is in continuous rotation, clamping the card 37 between the roller 334 and the wheel 324 serves to rapidly discharge the card 37 from the recorder unit 30 into a suitable receptacle therefor. When the solenoid 344 is released, the armature 346 is returned to the normal position illustrated in FIG. 2 by biasing means (not shown) so that the pin 351 engages the offset end portion 354*a* of the spring 354 to pivot the bracket 336 in a counterclockwise direction and thus moves the idler roller 334 out of engagement with the wheel 324.

Referring now to the sensing unit 36 (FIGS. 9 and 10) which is selectively operated by an inserted key, check, or badge 38 to provide information to the recorder unit 30 representing the designation or identification of the employee, this unit includes a frame 356 secured to the housing 43 of the recorder unit. To provide a channel or guideway 358 in alignment with a key entrance 360 formed in the housing 43, a laminated construction including a plurality of plates 362, 364, 366, 368 and 370 is provided. The plates 364, 368 and 370 are positioned between the top plate 362 and the bottom plate 366 to define the side and back edges of the channel 358.

To provide a means for selectively transmitting electrical signals under the control of the perforations or apertures 40 in the sensed key 38, twenty pairs of contact springs 372, 374 are provided which are arranged in five rows, each including four pairs of springs. The springs 374 include an inclined portion 374*a* which, when deflected, moves each of the pairs of springs 372 and 374 into engagement to complete an electrical circuit therethrough which is used for storage of information in the control circuit 39. The pairs of springs 372, 374 are mounted in a spaced relationship on the frame 356 by a dielectric block 376.

The springs 372, 374 are selectively operated in accordance with the perforations 40 in the key 38 by a plurality of dielectric sensing pins 378 having a configuration similar to that of the holes 40. These pins are arranged in five rows of four pins corresponding to the five rows of apertures shown on the key 38 (FIG. 17) representing the five digits of the designation of the employee. The sensing pins 378 are slidably mounted in each of a pair of spaced plates 380 and 382 which are held in a spaced relationship by two diagonally spaced headed fasteners 384, a pair of spacer sleeves 386 being disposed between the plates 380 and 382 and encircling the two fasteners 384. In order to slidably mount the plates 380 and 382 on the top plate 362, a pair of supporting rods 388 are provided at the other two diagonally opposed corners of of the plates 380 and 382. The rods 388 are slidably mounted in the plates 380 and 382. To hold the pins 378 on the plates 380 and 382, each of the pins 378 is provided with a connected collar 390 so that a coil spring 392 encircling the pin 378 and interposed between the collar 390 and the plate 380 biases the collar 390 against the plate 382. In this position the ends of the pins 378 are disposed within aligned openings 394 in the plate 362.

To move the sensing pins 378 into the channel 358 to sense the perforations 40 in an inserted key 38, a solenoid 396 is provided having an armature 398. The outer end of the armature 398 is bifurcated to receive the end of a link 400 which is pivotally connected thereto by a pin 402. The other end of the link 400 is pivotally connected to a pair of spaced arms 404 and 406 by a pivot pin 408. One end of the arms 404 and 406 is pivotally connected to the frame 356 by a rod 10, and the other end of the arms 404 and 406 is pivotally connected to the top plate 380 by a pair of brackets 412 and 414 which are secured to the plate 380. A plurality of sleeves 416, 418 and 420 are disposed between the brackets 414 and 412 and the links 404 and 406 to maintain them in a proper spaced relationship. The arms 404 and 406 are resiliently biased to the normal position illustrated in FIGS. 9 and 10 by a spring 422 which bears at one end against a pin 424 carried on the frame 356 and which passes around the pin 410 to engage the pin 408 at its other free end.

To initiate operation of the sensing unit 36 in response to the insertion of a key 38 into the channel 358, a switch 426 is provided having an operating plunger 427. A flexible operator arm 428 is secured at one end to the switch 426 and extends downwardly through aligned openings in the top and bottom plates 362 and 366 to be disposed within the channel 358. If the key 38 is improperly inserted into the guideway or receptacle 358, a cutout portion 38*a* prevents engagement of the arm 428 by the key 38. However, when the key 38 is properly inserted into the channel or guideway 358, the end of the key 38 engages and deflects the resilient operator arm 428 to depress the plunger 427 so that the switch 426 is operated. The operation of the switch 426 causes the subsequent energization of the solenoid 396 so that the armature 398 thereof is retracted. Downward movement of the armature 398 pivots the connected arms 404 and 406 in a counterclockwise direction (FIG. 9) about the pin 410 so that the connected plates 380 and 382 move downwardly toward the top plate 362.

Downward movement of the plates 380 and 382 moves the ends of the sensing pins 378 into the channel 358. All of the pins which engage the top surface of the key 38 move upwardly relative to the plates 380 and 382 against the action of the compression springs 392. However, those of the sensing pins 378 which are aligned with the apertures 40 in the key 38 pass downwardly through aligned openings 429 in the bottom plate 366 of the guideway 358 to engage the offset end portions 374*a* of the spring pairs 372, 374. This engagement of the springs 374 cams these springs into engagement with the related springs 372, thereby to selectively complete circuits to the control circuit 39 in accordance with the coded representation of the employee's number provided by the perforations 40 on the key or badge 38.

Incident to the completion of the sensing operation, as determined by the control circuit 39, the energization of the solenoid 396 is terminated so that the spring 422 withdraws the retracted armature 398 and pivots the arms 404 and 406 to their normal position, as illustrated in the drawings. This clockwise movement of the connected arms 404 and 406 moves the plates 380 and 382 so that the sensing pins 378 are withdrawn from the guideway 358 and the perforations 40 in the key 38, thereby permitting the key 38 to be withdrawn. Withdrawing the key from the guideway 358 restores the deflected spring operator arm 428 to its normal position so that the switch 426 is released.

The timing circuit 34 (FIG. 12) is continuously operative to provide marking conditions or signals representing instant date and time which are selectively supplied to the punching apparatus 48 for entry on the card 37 under the control of the control circuit 39. To this end, the timing circuit 34 includes six serially connected stepping switches 440, 450, 460, 470, 480 and 490 which are operative to register hundredths and tenths of an hour, tens and units hours, and tens and units days, respectively. The timing circuit 34 further includes four manually adjustable rotary switches 501, 502, 503 and 504 for registering or for providing marking conditions representing two digits of a month designation and two digits of a year designation.

When the timing circuit 34 is placed in operation to provide a continuous indication of instant date and time, a switch 430 is closed to connect the winding of a timing motor 432 across a voltage source connected to a pair of terminals 433 and 434. The shaft of the motor 432 is connected to four control cams 435, 436, 437 and 438 which selectively open and close a plurality of contacts *435a*, *436a*, *437a* and *438a* associated therewith, as indicated in the timing diagram shown in FIG. 15 of the drawing. The speed of rotation of the motor 432 is such that the contacts *435a* are momentarily closed at intervals of thirty-six seconds.

When the contacts *435a* are closed, B+ potential from a voltage source comprising an input transformer 431 connected between the terminals 433 and 434 and a full-wave rectifier bridge 439 is extended to the operating winding of a motor magnet 441 for the stepping switch 440 through a pair of normally closed contacts 511 on a reset relay 510. The energization of the motor magnet 441 advances a pair of wipers 442 and 443 a single step. Since the motor magnet 441 is energized at thirty-six second intervals, or .6 minute intervals, the stepping switch 440 provides a continuous indication of the hundredths of an hour. To provide signals or marking conditions representing the value of the hundredths of an hour digit, the wiper 442 is adjustably positioned relative to its contact bank which is connected to the interposer solenoids 294. The contacts in the bank are each connected to one of the solenoids 294 as indicated by the digits appearing immediately adjacent the contacts in FIG. 12 of the drawings.

The wiper 443 and the contacts in the bank engaged by this wiper provides means for selectively operating the tenths of an hour register switch 450 at the end of each cycle of operation of the hundredths of an hour register switch 440. Further, it should be noted that the wipers 442 and 443 are offset a single step from each other relative to their associated contact banks so that, when the wiper 442 engages the third contact in its bank representing the digit "2," the wiper 443 engages the second contact in its bank. When the wiper 443, following the receipt of ten pulses representing an elapsed time of 360 seconds or 6 minutes, is moved into engagement with the tenth contact in its bank, a circuit is completed for energizing a motor magnet 451 in the stepping switch 450. This circuit extends from the B+ potential through the contacts *438a*, which are now closed by the cam 438, over the wiper 443, and through a plurality of pairs of normally closed contacts *454a* and 513 to the operating winding of the motor magnet 451. The operation of the motor magnet 451 advances a pair of wipers 452 and 453 to their next stepping position. The wiper 452, which registers the tenth of an hour data, and the wiper 453, which controls the operation of the units hour register switch 460, are offset from each other a single step as with the wipers 442 and 443.

Figure 12:
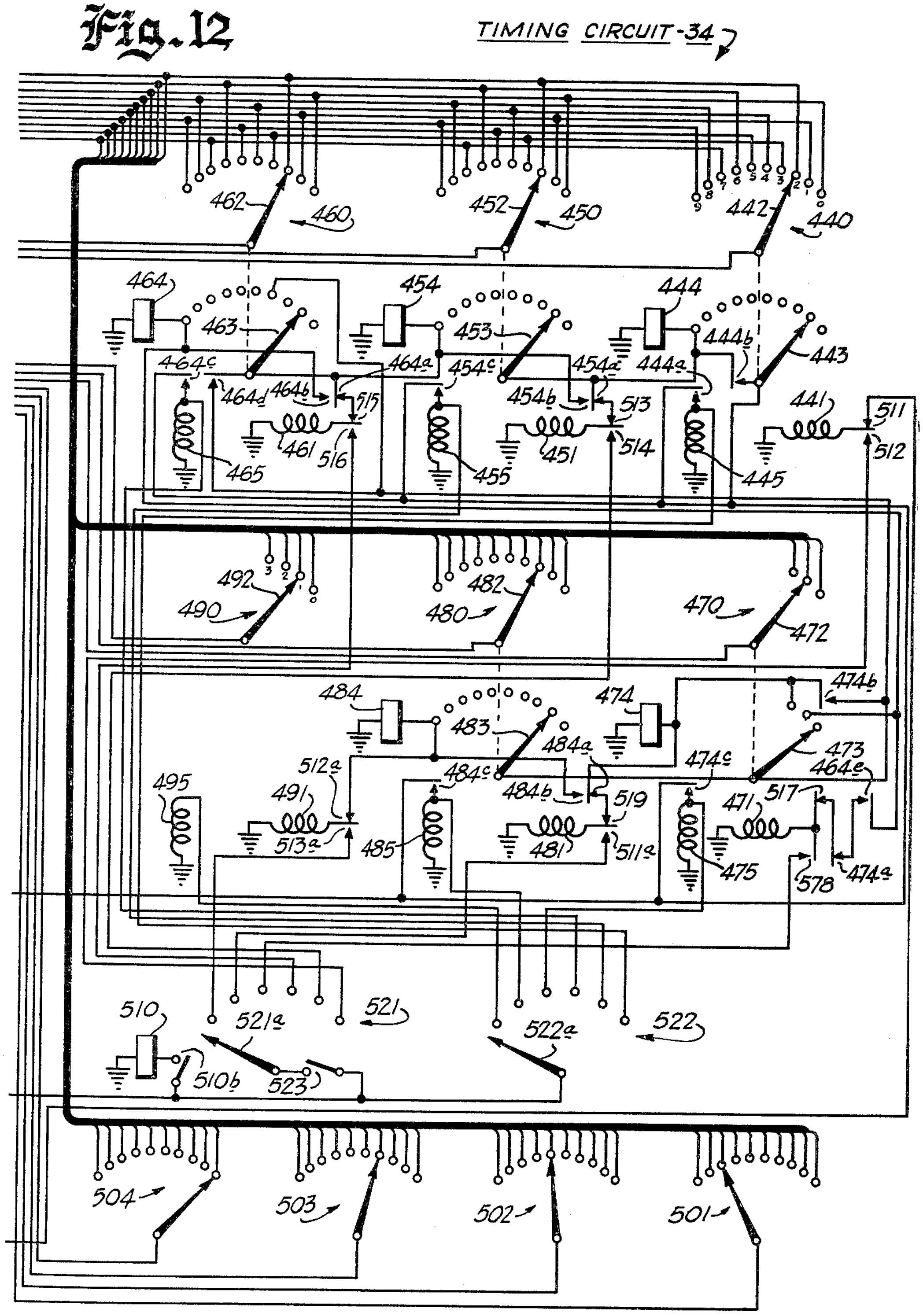
Figure 13:
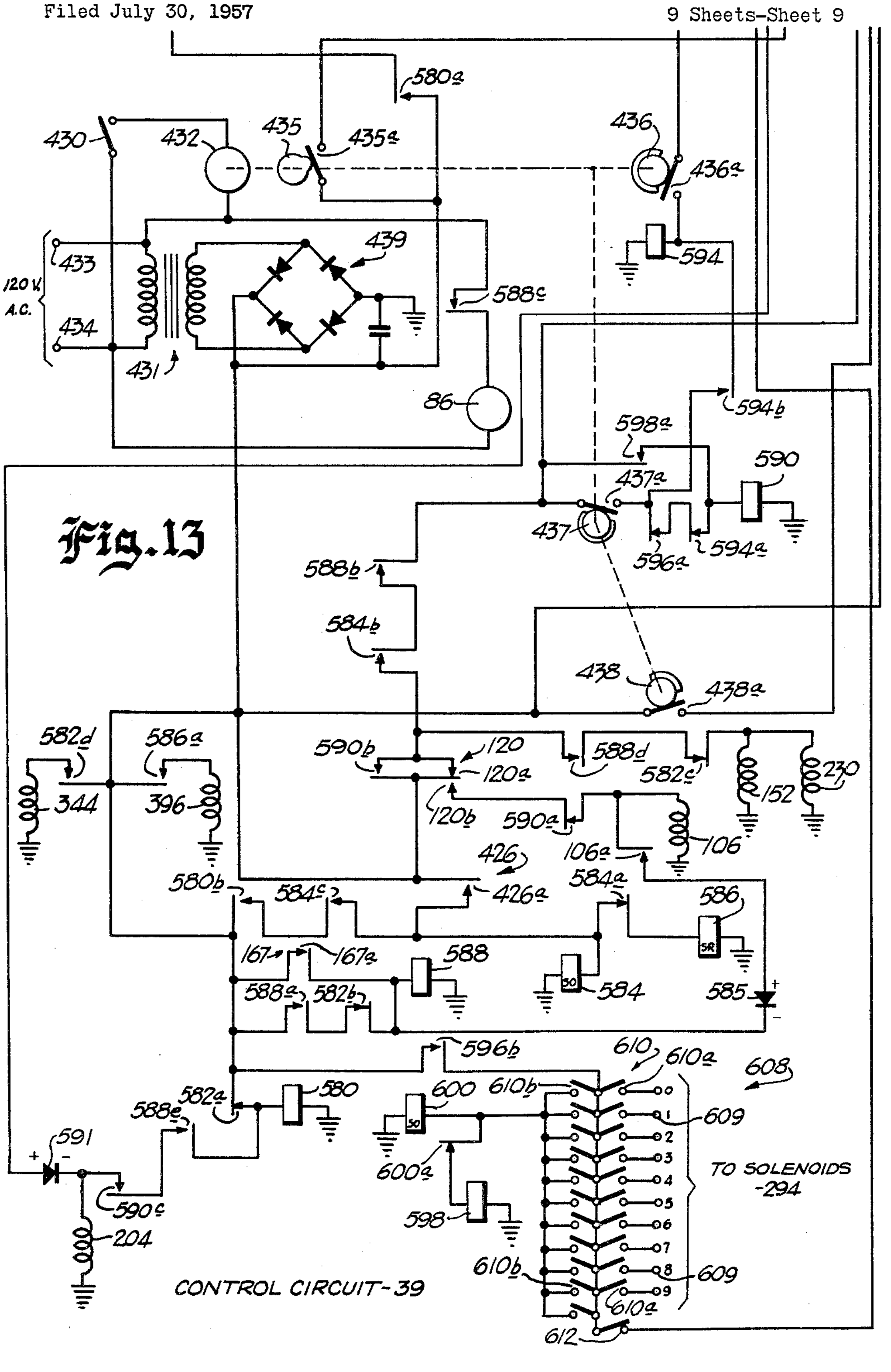

Concurrently with energizing the motor magnet 451, the B+ potential forwarded over the wiper 443 completes an obvious operating circuit for a relay 444 so that this relay operates to close a plurality of contacts *444a* and *444b*. The closure of the contacts *444b* completes a shunt around the wiper 443 to maintain the relay 444 and the motor magnet 451 operated when the wiper 443 is restored to a normal condition. The closure of the contacts *444a* completes an obvious operating circuit for a reset magnet 445 which restores the wipers 442 and 443 to their normal condition, thus interrupting the above described operating circuit for the motor magnet 451 and the relay 444. In this normal position, the wiper 443 does not engage one of the contacts in the bank illustrated in FIG. 12 and the wiper 442 is moved into engagement with the contact designated "0," as shown in FIG. 12. Accordingly, in response to the receipt of ten operating pulses, the hundredths of an hour register switch 440 completes a cycle of operation during which the tenths of an hour register switch 450 is advanced a single step and the register switch 440 is then restored to a normal condition. After a time delay, as indicated by the timing diagram in FIG. 15, the cam 438 opens the contacts *438a* to interrupt the holding circuit for the motor magnet 451, the relay 444, and the reset magnet 445 so as to restore these components to their normal released condition.

At the end of ten steps of operation of the tenths of an hour register switch 450, the wiper 453 is advanced into engagement with the tenth contact in the bank associated therewith so that B+ potential is forwarded from the closed contacts *438a* over the wipers 443 and 453 and through a plurality of normally closed contacts *464a* and 515 to energize the operating winding of a motor magnet 461 in the units hours register switch 460, thereby advancing a pair of wipers 462 and 463 therein a single step at the end of each sixty minute interval. Concurrently with completing the operating circuit for the motor magnet 461, the B+ potential supplied over the wiper 453 completes an obvious operating circuit for a relay 454 so that this relay operates to close a plurality of contacts *454b* and *454c* and to open the contacts *454a*. The opening of the contacts *454a* interrupts the operating circuit for the motor magnet 451 in the tenths of an hour register switch 450. The closure of the contacts *454b* completes a shunt around the wiper 453 to hold the relay 454 and the motor magnet 461 operated following the reset of the wiper 453. The closure of the contacts *454c* completes an obvious operating circuit for a reset magnet 455 for the tenths of an hour register switch 450. The operation of the reset magnet 455 restores the wipers 452 and 453 to a normal condition in which the wiper 452 engages the "0" manifesting contact in the bank associated therewith and in which the wiper 453 does not engage one of the contacts in the bank illustrated in FIG. 12. When the cam 438 next opens the contacts *438a*, the motor magnet 461, the relay 454 and the reset magnet 455 are released.

Referring now to the units hours register switch 460, the wipers 462 and 463 thereof are offset a single step from each other in the manner of the wipers 442 and 443 and 452 and 453. The contacts in the bank engaged by the wiper 462 are connected in common to the interposer solenoids 294 in the same manner as the contacts forming the bank adjacent the wiper 442. The wiper 463 and the contact bank associated therewith provide means for selectively controlling the operation of the tens hours register switch 470.

At the end of each ten hour interval, the wiper 463 is moved into engagement with the tenth contact in the bank associated therewith so that B+ potential is extended from the tenth of an hour register switch 450 and over the wiper 463 to complete an obvious energizing circuit for a relay 464. In operating, the relay 464 opens the contacts *464a* and closes a plurality of contacts *464b*, *464c*, *464d* and *464e*. The closure of the contacts *464b* connects a shunt around the wiper 463 to maintain the relay 464 operated when this wiper is restored to its normal condition. The opening of the contacts *464a* interrupts the above described operating circuit for the motor magnet 461. The closure of the contacts *464c* completes an energizing circuit for a reset magnet 465 for the switch 460 so that the wiper 462 and 463 are restored to their normal condition. The closure of the contacts *464e* together with the closure of the contacts *464b* extends the B+ potential provided by the tenths of an hour register switch 460 over a circuit including these closed contacts and a plurality of normally closed contacts 474*a* and 517 to energize the operating winding of a motor magnet 471 for the tens hours register switch 470.

The operation of the motor magnet 471 advances a pair of wipers 472 and 473 a single step. The wipers 472 and 473 are offset in the manner of the wipers in the preceding register switches, and the wiper 472 is provided with a contact bank selectively connected in common to the interposer magnets 294 in the punching assembly 48. The wiper 473 and the contact bank associated therewith provide means for selectively advancing the units days register switch 480 and for restoring the units hours register switch 460 to a normal position. When the cam 438 next opens the contacts 438*a*, the B+ potential supplied to the control circuits associated with the register switches 440, 450, and 460 is removed to release the relay 464, the motor magnet 471, and the reset magnet 465.

When the tens hours register switch 470 is advanced a second step indicating the expiration of twenty hours, the wiper 473 is moved into engagement with the second contact of the bank associated therewith. At the end of the day, i.e. at the end of the twenty-fourth hour, the wiper 463 in the units hours register switch 460 is advanced into engagement with the contact in the fourth stepping position thereof so that the positive potential supplied from the tenth of an hour register switch 450 is extended over the wiper 463 and the wiper 473 to the operating winding of the relay 464, thereby operating this relay to open the contacts 464*a* and to close the contacts 464*b*, 464*c*, 464*d* and 464*e*. The opening of the contacts 464*a* interrupts the operating circuit for the motor magnet 461 of the units hours register switch 460. The closure of the contacts 464*b* provides a holding circuit for the relay 464 and a source of positive potential for operating the motor magnet 471 in the tens hours register switch 470. The closure of the contacts 464*d* forwards a source of holding potential to the tens hours register switch 470. The closure of the contacts 464*c* completes the above described operating circuit for the reset magnet 465 in the units hours register switch 460, thereby restoring the wipers 462 and 463 to their normal condition.

The closure of the contacts 464*e* forwards the positive potential supplied at the closed contact 464*b* through the closed contacts 474*a* and 517 to energize the motor magnet 471 in the tens hours register switch 470. The operation of the motor magnet 471 advances the wipers 472 and 473 a single step. The wiper 473, in moving into engagement with the third contact in the bank associated therewith, completes concurrent operating circuits for a relay 474 and for a motor magnet 481 in the units days register switch 480, the latter circuit including a plurality of normally closed contacts 484*a* and 519. The operation of the motor magnet 481 advances a pair of wipers 482 and 483 a single step. The wiper 482 is adapted to selectively engage contacts in a bank which are connected in multiple to the interposer solenoids 294 in the punching apparatus 48 in the manner described above. The wiper 483 provides a means for selectively controlling the operation of the tens days register switch 490.

As described above, the relay 474 is operated concurrently with the operation of the motor magnet 481 to open the contacts 474*a* and to close a plurality of contacts 474*b* and 474*c*. The opening of the contacts 474*a* interrupts the above described operating circuit for the motor magnet 471 so that this magnet is released. The closure of the contact 474*b* forwards the positive potential supplied at the closed contacts 464*d* to the motor magnet 481 and to the relay 474 so as to maintain these components in an operated condition when the wiper 473 is restored to its normal condition. The closure of the contacts 474*c* completes an obvious operating circuit for a reset magnet 475 in the tens hours register switch 470 so that the wipers 472 and 473 are restored to their normal condition in which the wiper 473 does not engage one of the contacts in the bank illustrated in FIG. 12 and in which the wiper 472 engages the first contact in the bank associated therewith which is connected to the interposer solenoid 294 representing "0." When the cam 438 next opens the contacts 438*a*, the relays 464 and 474, the reset magnets 465 and 475, and the motor magnet 481 are released together with the relays 444 and 454 and the reset magnets 445 and 455. Therefore, at this time, the register switches 440, 450, 460 and 470 are reset to their "0" manifesting conditions and the units days register switch 480 has been advanced to a setting representing the next succeeding day.

At the end of each ten day interval, the wiper 483 in the units days register switch 480 is advanced into engagement with its tenth contact to complete an obvious operating circuit for a motor magnet 491 in the tens days register switch 490, which circuit extends through a pair of normally closed contacts 512*a*. The energization of the motor magnet 491 advances a wiper 492 a single step into engagement with the next adjacent contact to increase the value of the tens days digit by one. The contacts in the bank engaged by the wiper 492 are connected to the interposer solenoids 294 in the punch assembly 48. The completion of the energizing circuit of the motor magnet 491 occurs simultaneously with the completion of an obvious operating circuit for a relay 484, the operation of which opens the contacts 484*a* and closes a plurality of contacts 484*b* and 484*c*. The closure of the contacts 484*b* completes a shunt around the wiper 483 to maintain the relay 484 and the motor magnet 491 operated. The closure of the contacts 484*c* completes an obvious operating circuit for a reset magnet 485 for the units days register switch 480. The operation of the reset magnet 485 restores the wipers 482 and 483 to their normal position. When the cam 438 next opens the contacts 438*a*, the B+ potential for the relay 484, the magnet 491 and the reset magnet 485 together with the similar operated components associated with the remaining register switches in the timing circuit 34 is removed, thereby to restore these components to their normal conditions. Thus, in response to each ten steps of operation of the units days register switch 480, the tens days register switch 490 is advanced a single step.

In summary therefore, the register switches 440, 450, 460, 470, 480 and 490 which are periodically operated under the control of the cams 435 and 438 provide a continuous indication of the value of the tens, units, tenths and hundredths digits of time and the tens and units digit of days. To provide a means for supplying the punching apparatus 48 with two digits identifying the month and two digits identifying the year, the manually adjusted switches 501, 502, 503 and 504 are provided. These switches are manually adjusted to settings corresponding to the digital designation of month and year at the beginning of each month. The manual switches 501—504 could be replaced by stepping switches periodically operated by a control circuit of the type illustrated in conjunction with the switches 440, 450, 460, 470, 480 and 490 if it is desired to provide continuously adjustable month and year designations. Circuits of this type are well known in the field of automatic telephony for providing date and time information in automatic toll ticketing systems.

To provide means for adjusting the timing circuit 34 to a correct date and time setting, a reset relay 510 is provided. This relay is operated by manually closing a switch 510*b* when a resetting operation is to be performed. The operation of the reset relay 510 opens the contacts 511, 513, 515, 517, 519 and 512*a* and closes a plurality of contacts 512, 514, 516, 518, 511*a* and 513*a*. The opening of the above identified contacts interrupts the above described operating circuits for the various motor magnets 441, 451, 461, 471, 481 and 491, and the closure of the above identified contacts connects the operating windings of these motor magnets to the contacts of a manually operable adjusting switch 521. The contact bank of a selecting and resetting switch 522 is connected to the operating windings of the reset magnets 445, 455, 465, 475 and 485 in the above identified register switches and also to a reset magnet 495 in the tens days register switch 490.

When the timing circuit 34 is to be reset the relay 510 is operated and a wiper 522*a* of the switch 522 is moved over the contacts in the bank associated therewith so that B+ potential is applied to the reset magnets 445, 455, 465, 475, 485 and 495 in sequence. This operates all of the reset magnets to restore all of the register switches to normal. A wiper 521*a* of the switch 521 is then adjusted to its first position to engage a contact to which is connected the operating winding of the motor magnet 491. Thereafter, a switch 523 is opened and closed the number of times necessary to adjust the register switch 490 to a correct setting of tens days. In a like manner, the switch 521 is operated so that the wiper 521*a* successively engages the contacts in the bank associated therewith so that, by operation of the switch 523, the switches 440, 450, 460, 470 and 480 are adjusted to an indication representing the correct time. Following the completion of the setting of the timing circuit 34 to a correct manifestation of the instant date and time, the switch 521 is restored to its normal position and the switch 510*b* is opened to release the reset relay 510. This restores control over the motor magnets of the register switches in the timing circuit 34 to the periodic pulses supplied by the contacts 435*a* under the control of the cam 435.

Referring now to the control circuit 39 (FIGS. 11 and 13), this circuit includes a plurality of groups of register relays which are selectively operated under the control of the sensing device 36 so that the coded information representing the employee badge number represented by the perforations 40 in the badge 38 can be selectively stored for use by the punching apparatus 48. These storage facilities include five groups of register relays 530, 540, 550, 560 and 570 corresponding to the five rows of perforations 40 in the badge 38 which are adapted, for example, to store the digits "5," "0," "3," "6" and "1," respectively, forming the employee's badge number in the illustrious example shown in FIG. 17. These five groups of register relays each include four relays 531, 532, 534 and 538; 541, 542, 544 and 548; 551, 552, 554 and 558; 561, 562, 564 and 568; 571, 572, 574 and 578, respectively. These relays are selectively operated to store the coded representation of the digits forming the employee badge number under the control of the pairs of springs 372 and 374 in the sensing device 36 and are held operated over a local holding circuit following the operation of the sensing device 36 and until such time as the perforation of the card 37 has been completed.

More specifically and as an illustrative example, when the badge 38 is sensed, two sensing pins 378 in the first row thereof selectively operate two sets of the springs 372 and 374 so that the relays 531 and 534 are operated. The operation of the relay 531 closes a plurality of contacts 531*a* and 531*c* and opens a pair of contacts 531*b*. The operation of the relay 534 closes a plurality of contacts 534*a*, 534*c*, 534*e*, 534*g* and 534*i* and opens a plurality of contacts 534*b*, 534*d*, 534*f*, and 534*h*. The closure of the contacts 531*a* and 534*a* completes a holding circuit for the relays 531 and 534 to maintain these relays operated following the completion of the operation of the sensing device 36. The remaining contacts controlled by these two relays are a part of a conventional decoding "tree" which serves to convert the binary code provided by the apertures 40 in the badge 38 into marking conditions representing a decimal digit. As an example, the closure of the contacts 531*c* and 534*g* prepares a marking path controlled by the commutator 244 for extending B+ potential to the interposer solenoid 294 controlling the punch representing the digit "5." This path extends from the commutator 244 through the closed contacts 531*c*, a pair of normally closed contacts 532*d* controlled by the relay 532, the closed contacts 534*g* and thence to the winding of the "5" solenoid 294. In this manner, the selective operation of the relays 531 and 534 in the first storage relay group 530 prepares a marking path extending from the commutator 244 to the solenoid 294 representing the digit "5."

In a similar manner, the relay groups 540, 550, 560 and 570 selectively prepare marking paths under the control of the sensing device 36 representing "0," "3," "6" and "1," respectively. Thus, in response to the operation of the sensing device 36, the relay groups 530, 540, 560 and 570 are selectively operated and held operated to translate the binary representation on the badge 38 to marking conditions representing decimal digits for selectively controlling the subsequent operation of the interposer solenoids 294 under the control of the commutator 244 in the control circuit 39.

Referring now to a cycle of operation of the recorder unit 30 under the control of the circuit 39, the recorder unit 30 is placed in condition for operation by closing the switch 430 to start the timing motor 432 so that the cams 435, 436, 437 and 438 rotate to periodically close and open the contacts 435*a*, 436*a*, 437*a* and 438*a*. Incident to starting operation of the recorder unit 30, the reset relay 510 is operated and the adjusting switches 521 and 522 are actuated to adjust the timing circuit 34 to a correct setting representing instant date and time. In the circuit 34, the switches 501, 502, and 503 and 504 are manually adjusted to settings representing month and year. In the normal condition of the control circuit 39, an operating circuit is completed for a code reset relay 580 extending from the full wave rectifier 439 through a pair of normally closed contacts 582*a*. The operation of the relay 580 closes a plurality of contacts 580*a* and 580*b*. The closure of the contacts 580*a* extends B+ potential to the holding circuits for the groups of register relays 530, 540, 550, 560 and 570.

The operation of the recorder unit 30 may be initiated by inserting the key 38 into the sensing unit 36. If the key 38 is properly inserted into the sensing unit 36, as determined by the relative position of the recessed portion 38*a*, the operator arm 428 of the switch 426 is engaged and deflected so that the switch 426 is operated to close a pair of contacts 426*a*. The operation of switch 426 closes a pair of contacts 426*a* to complete an obvious operating circuit for a slow-to-operate code latch relay 584 and also, through a pair of normally closed contacts 584*a*, for a slow-to-release code relay 586. The operation of the relay 586 closes a pair of normally open contacts 586*a* to complete an obvious energizing circuit for the solenoid 396. The energization of the winding of the solenoid 396 retracts the armature 398 (FIG. 9) so that the links 404 and 406 are pivoted in a counterclockwise direction to move the sensing pins 378 into the guideway 358 in which the inserted key 38 is disposed. Certain of the sensing pins 378 pass through the diamond-shaped openings 40 in the key 38 to engage and close the adjacent spring pairs 372, 374. This selective operation of the spring pairs causes the storage of the employee badge number or designation in the groups of register relays 530, 540, 550, 560 and 570.

With the key 38 illustrated in FIG. 17 inserted into the sensing unit 36, the relays 531 and 534 in the storage relay group 530, none of the relays in this relay storage group 540, the relays 551 and 552 in the relay storage group 550, the relays 562 and 564 in the storage relay group 60, and only the relay 71 in the relay storage group 570 are operated by the actuation of the solenoid 396. The operation of the relays 531 and 532, for instance, in closing the contacts 531*a* and 534*a*, completes holding circuits to B+ potential through the closed contacts 580*a*. In a similar manner, the selective operation of the remaining relays in the remaining relay groups completes local holding circuits extending to B+ potential through the closed contacts 580*a*. The operation of the relays 531 and 534 in the relay storage group 530 prepares the path extending from the commutator 244 through the closed contacts 531*c*, 532*d* and 534*g* to the operating winding of the interposer solenoid 294 representing the digit "5." In a similar manner, the absence of operated relays in the storage group 540 prepares a marking path extending to the interposer solenoid 294 representing "0," and the operated relays in the groups 550, 560 and 570 prepare paths extending to the interposer solenoids 294 representing "3," "6" and "1," respectively.

After the slow-to-operate characteristic of the code latch relay 584, this relay operates to open the contacts 584*a* and to close a plurality of pairs of contacts 584*b* and 584*c*. The closure of the contacts 584*c* completes a holding circuit for the relay 584 extending to B+ potential through the closed contacts 580*b*. The closure of the contacts 584*b* conditions a circuit for subsequent operation, but the opening of the contacts 584*a* interrupts the above described operating circuit for the code relay 586. After a suitable time delay period determined by the slow-to-release characteristic thereof, the relay 586 releases to open the contacts 586*a* and thus terminates the energization of the solenoid 396. Upon release of the solenoid 396, the spring 422 (FIG. 9) biases the arms 404 and 406 in a clockwise direction and thus retracts the sensing pins 378 from the guideway 358 and the apertures 40 in the key 38, thereby permitting this key to be removed. Further, in withdrawing the sensing pins 378, the engaged and closed pairs of springs 372, 374 are released to interrupt the operating circuits for the selectively operated relays in the groups 530, 540, 550, 560 and 570. However, these relays remain operated over the holding circuits which have been completed as described above.

In addition to inserting the key 38 into the sensing unit 36, a cycle of operation of the recorder unit 30 is initiated by inserting a blank card 37 into the guideway 56 (FIG. 2) so that the leading edge of the card 37 engages and deflects the operator arm 128, thereby operating the switch 120. The operation of the switch 120 opens a pair of contacts 120*a* (FIG. 13) and closes a pair of contacts 120*b*. The closure of the contacts 120*b* extends B+ potential through a pair of normally closed contacts 590*a* to energize the solenoid 106. The energization of the solenoid 106 in the card feeding drive assembly 42 pivots the bracket 90 (FIG. 2) about the axis of the shaft 98 so that the idler roller 88 is resiliently biased into engagement with the driving wheel 72. In addition, the energization of the solenoid 106 closes a pair of contacts 106*a* (FIG. 13) so that B+ potential is extended to the operating winding of a card relay 588, thereby operating this relay to close a plurality of contacts 588*a–e*. The closure of the contacts 588*a* completes a holding circuit for the relay 588 extending to B+ potential through a pair of normally closed contacts 582*b*. The closure of the contacts 588*c* completes the energizing circuit for the motor 86 extending to the input terminals 433 and 434. The energization of the motor 86 initiates rotation of the drive wheel 74 so that, when the leading edge of the card 37 is interposed between the driving wheel 72 and the idler roller 88, this card is rapidly advanced to engage the gate element 134.

When the leading edge of the card 37 engages the gate element 134, the drive including the idler roller 88 and the wheel 72 slips. As the card 37 moves into engagement with the gate element 134 in the stop assembly 46, the trailing edge thereof moves out of engagement with the operator arm 128 for the switch 120 so that this switch releases to open the contacts 120*b* and to close the contacts 120*a*. The opening of the contacts 120*b* interrupts the above described energizing circuits for the relay 588 and the solenoid 106, but the relay 588 remains operated over the above described holding circuit. The holding circuit including the contacts 588*a* and 582*b* does not hold the solenoid 106 operated because of a blocking diode 585. The release of the solenoid 106 permits the armature 110 (FIG. 2) thereof to move to its normal positon to pivot the idler roller 88 out of engagement with the card 37, thereby rendering the card feeding drive assembly 42 ineffective.

The closure of the contacts 120*a* together with the prior closure of the contacts 588*d* due to the operation of the card relay 588 completes parallel energizng circuits for the solenoids 152 and 230 extending to B+ potential through a pair of normally closed contacts 582*c*. The energization of the solenoid 230 retracts the armature 232 (FIG. 2) so that the idler roller 220 is pivoted into engagement with the portion of the card 37 disposed in alignment with the step-by-step drive wheel 168, thereby rendering the wheel 168 effective to control step-by-step movement of the card 37 during the perforating operation. The energization of the solenoid 152 retracts its armature 160 (FIG. 4) so that the gate element 134 is elevated out of the card intercepting position across the guideway 138 in the punch guiding frame 136, thereby to permit the card 37 to be advanced step-by-step by the indexing drive assembly 44. In moving upwardly, the upper end of the gate 134 engages and deflects the operator arm 169 so that the switch 167 is actuated to close a pair of contacts 167*a*. The closure of the contacts 167*a* completes another holding circuit for the card relay 588, thereby to insure that this relay remains operated until such time as the punched card 37 is ejected from the recorder unit 30.

Figure 15:
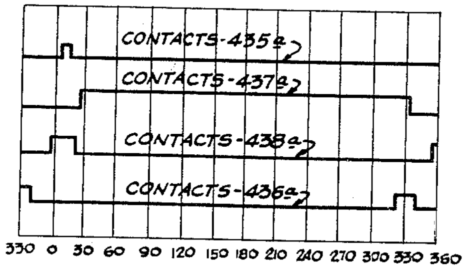
FIG. 15 is a timing diagram of a control cam arrangement used in the control and timing circuit shown in FIGS. 11–13.

The operation of the card relay 588, in addition to rendering the stop assembly 46 ineffective and the idler roller 220 in the indexing assembly 44 effective, also initiates operation of the punching assembly 48 and step-by-step movement of the indexing wheel 168. More specifically, the closure of the contacts 120*a*, which indicates that the card 37 has been advanced to a punching position, and the prior closure of the contacts 584*b* and 588*b* extends B+ to the pair of contacts 437*a* controlled by the cam 437 driven by the timing motor 432. As indicated in FIG. 15, the cam 437 closes the contacts 437*a* following the opening of the contacts 435*a* and 438*a* during each cycle of revolution of the shaft of the motor 432. Accordingly, when the contacts 437*a* are closed B+ potential is forwarded through two pairs of normally closed contacts 596*a* and 594*a* to complete an obvious operating circuit for a punch relay 590.

The operation of the relay 590 closes a plurality of contacts 590*b* and 590*c* and opens the contacts 590*a*. The closure of the contacts 590*b* completes a shunt around the contacts 120*a* to hold the relay 590 operated in the event that the switch 120 is inadvertently operated to open the contacts 120*a*. The opening of the contacts 590*a* interrupts the above described operating circuit for the feed drive solenoid 106 at an additional point to prevent an additional card 37 from being advanced in the guideway 56 to the punching apparatus 48 during the interval in which the preceding card 37 is being perforated by the assembly 48.

The closure of the contacts 590*c* completes an operating circuit for the clutch solenoid 204 extending from B+ potential through the closed contacts 582*a*, 588*e* and 590*c*. The energization of the clutch solenoid 204 retracts the armature 202 (FIG. 7) so that the detent 194 is moved out of engagement wtih the shoulder 192 on the control cam 180. This permits the control shaft 174 to be placed in rotation and to remain in rotation until such time as the punch relay 590 is next released. The speed at which the punching apparatus 48 operates is such that a complete card 37 can be punched within the interval indicated in FIG. 15 in which the cam 437 maintains the contacts 437*a* closed. However, in the event that the cam 437 opens the contacts 437*a* prior to the completion of the perforating operation, the control circuit 39 remains in the present condition until the contacts 437a are again closed and, at that time, the punching operation is completed.

As described in detail above, when the latch or detent 194 is released, the control shaft 174 is placed in rotation so that the step-by-step drive assembly 44 is rendered effective to advance the card 37 a single step incident to each operation of the punching assembly 48 under the control of the interposer solenoids 294, which solenoids are selectively operated in accordance with the different registered items of information under the control of the commutator 244. As indicated in the timing diagram in FIG. 16, following the operation of the latch solenoid 204, the cam 323 operates the switch 321 to close a pair of contacts 321a. The closure of these contacts extends the B+ potential supplied through the closed contacts 590b, 584b, 588b and 321a to the common segment 254 of the commutator 244. This potential is extended through the connected wipers 250 and 252 to the decoding path selectively prepared under the control of the first group 530 of register relays in accordance with the value of the first digit of the employee's badge number. More specifically, this B+ potential is extended through the closed contacts 531c, 532d and 534g to be applied to the operating winding of the interposer solenoid 294 representing the digit "5." The energization of this solenoid displaces the armature 296 thereof so that the enlarged portion 298a (FIG. 2) of the arm 298 connected thereto is interposed between the punch supporting frame 288 and the shouldered portion 282a of its support 282.

Continuing rotation of the shaft 174 moves the cams 320 and 322 (FIGS. 2 and 5) into a position (FIG. 16) in which the cam followers 312 and 314 are displaced downwardly to lower the punch supporting frame 288. During this downward movement and since only the punch element 276 representing the digit "5" is blocked from movement relative to the supporting frame 288, a perforation is produced in the fifth row of the first column of the card 37 representing the digit "5." Following the perforation of the digit "5" in the card 37 in the first index position or column thereof, the cam 323 opens the contacts 321a and the cams 320 and 322 permit the springs 316 and 318 to restore the punch frame 288 to its normal position.

Figure 16:
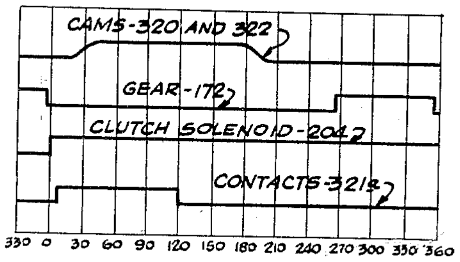
FIG. 16 is a timing diagram illustrating the relative operation of components of the punching mechanism and the card indexing drive assembly.

Rotation of the shaft 174 thereafter moves the single tooth or pin 176 on the hub 178 into engagement with the gear 172 so that the index drive wheel 168 is advanced through a short increment of angular movement during which the card 37 is advanced to the next punching position (FIG. 16). In order to advance the commutator 244 a single step during the advancement of the card 37, the rotation of the gear 172 is effective through the gear train (FIG. 7) including the gears 264, 266, 268 and 270 to rotate the commutator shaft 258 through a short increment of angular movement so that the wiper 250 is advanced into engagement with the second segment of contact in the commutator 244, thereby disabling the decoding or translating network controlled by the first group 530 of register relays from controlling the interposer solenoids 294 and preparing these solenoids for selective operation under the control of the second group of register relays 540. At the end of the first cycle of rotation of the control shaft 174, the first digit has been perforated in the card 37, this card has been advanced a single step to its next punching position, and the commutator 244 has been advanced a single step to render the second group of register relays 540 effective to control the selective operation of the interposer solenoids 294.

During the next four cycles of rotation of the control shaft 174, the groups of registers relays 540, 550, 560 and 570 are sequentially rendered effective by the commutator 244 to selectively control the group of interposer solenoids 294 so that perforations representing the digits "0," "3," "6," and "1" are sequentially recorded on the card 37 in four successive columns thereof. Incident to this fourth additional or fifth cycle of rotation of the control shaft 174, the wiper 250 of the commutator 244 is moved into engagement with a contact to which is connected the wiper 472 in the tens hours register switch 460. Accordingly, during the next cycle of rotation of the control shaft 174, the interposer solenoids 294 are selectively operated in accordance with the value of the tens hours digit, the value of this digit is perforated in the card 37, and this card is advanced to its next punching position. During the next three cycles of revolution of the control shaft 174, the commutator 244 extends B+ potential to the wiper 462 in the units hours register switch 460, the wiper 452 in the tenths of an hour register switch 450, and the wiper 442 in the hundredths of an hour register switch 440 so that the values of these digits are recorded in successive columns on the card 37. The commutator 244 next extends B+ potential to the wipers 492 and 482 in the tens and units days register switches 490 and 480, respectively, so that the values of these digits are recorded on the card 37. During the next four cycles of revolution of the shaft 174, the punching apparatus 48 records the two digits representing the month and the two digits representing the year under the control of the B+ potential extended to the wipers of the switches 501—504 by the commutator 244.

The control circuit 39 also includes means for permitting manually entered data to be recorded on the card 37 by the recorder unit 30 following the recording of the registered or stored data. When the wiper 250 is advanced to its next stepping position following the perforation of the last digit of the month and year information on the card 37, a circuit is prepared for operating a hand punch stop relay 596. During the next cycle of rotation of the control shaft 174, the cam 323 again closes the contacts 321a so that B+ potential is supplied through the wipers 250 and 252 to complete an obvious operating circuit for the relay 596 which, in operating, opens the contacts 596a and closes a pair of contacts 596b. The closure of the contacts 596b extends B+ potential to a manual key set or keyboard assembly 608, and this B+ potential is further extended through a pair of normally closed release contacts 612 to the operating winding of the hand punch stop relay 596, thereby to maintain this relay operated when, upon continuing rotation, the cam 323 opens the contacts 321a to interrupt the above described operation circuit. The opening of the contacts 596a interrupts the above described operating circuit for the punch relay 590 so that this relay releases to close the contacts 590a and to open the contacts 590b and 590c.

The opening of the contacts 590c interrupts the operating circuit for the clutch solenoid 204 so that the detent 194 again moves into alignment with the shoulder 192 on the cam 180, thereby preventing the initiation of another cycle of rotation of the control shaft 174. The opening of the contacts 590b removes the shunt around the contacts 120, and the closure of the contacts 590a prepares the above described operating circuit for the solenoid 106. During the remainder of the cycle of rotation of the control shaft 174 prior to the engagement of the clutch cam 180 with the detent 194, the gear 172 is rotated through a short increment of angular movement to index the card 37 to its next punching position and to advance the commutator wipers 250 and 252 to the next stepping position of the commutator 244. The control circuit 39 and the recorder unit 30 remain in this condition until the manual key set assembly 608 is operated.

The key set assembly 608 includes a plurality of key set contact assemblies 610, each of which is operated upon actuation of the related key to close a pair of contacts 610a and 610b. Each of the contacts 610a is connected to a terminal 609, and the terminals 609 are connected to the ten interposer solenoids 294. Accordingly, when any one of the contact assemblies 610 is operated to close the related contacts 610*a*, B+ potential is supplied through the closed contacts 596*b* to operate the selected interposer solenoid 294. Concurrently therewith, the closure of the related contacts 610*b* extends B+ potential in parallel to the operating windings of a pair of relays 598 and 600, the operating circuit for the relay 598 including a pair of normally closed contacts 600*a*. The relay 600 is slow-to-operate so that the relay 598 operates first to close a pair of contacts 598*a*.

The closure of the contacts 598*a* completes an obvious operating circuit for the punch relay 590 so that this relay operates, as described above, to operate the clutch solenoid 204 so that the control shaft 174 initiates another cycle of rotation during which the key selected digital value is recorded in the card 37 and the card 37 is advanced a single step. After the slow-to-operate interval of the relay 600, this relay operates to open the contacts 600*a*, thereby interrupting the operating circuit for the relay 598. This relay, in releasing, opens the contacts 598*a* to release the relay 590 and accordingly, the clutch solenoid 204. This renders the detent mechanism effective to engage the control cam 180 and thus arrest movement of the control shaft 174 at the end of the single cycle of rotation during which the key selected digit is punched in the card 37 and the card 37 is advanced a single step to the next perforating or columnar position. When the actuated contact assembly 610 is released, the slow-to-operate relay 600 is released to close the contacts 600*a*, thereby preparing the operating circuit for the relay 598.

In this manner, the sequential operation of the key set assembly 608 causes the recorder unit 30 to perforate selected digital values in the card 37. At the end of the manually controlled perforating operation, the release key 612 is operated to interrupt the above described holding circuit for the hand punch stop relay 596, thereby releasing this relay to open the contacts 596*b* and to close the contacts 596*a*. The opening of the contacts 596*b* disables the key set or keyboard assembly 608 so that the recorder unit 30 can no longer be controlled by this assembly. The closure of the contacts 596*a* again completes the above described operating circuit for the punch relay 590, dependent upon the closed condition of the cam controlled contacts 437*a*. The operation of the relay 590 again energizes the clutch solenoid 204 so that the control shaft 174 passes through repeated cycles of rotation in which the commutator 244 is advanced toward its normal home position. However, since none of the interposer solenoids 294 are energized, the reciprocation of the punch frame 288 does not result in the perforation of information into the card 37 which is indexed by the drive assembly 44 during this continuing rotation of the control shaft 174.

When the wipers 250 and 252 move to the last stepping position of the commutator 244, an operating circuit is prepared for a last column relay 582, which circuit is completed when the cam 323 next closes the contacts 321. The operation of the last column relay 582 closes a pair of contacts 582*d* and opens the contacts 582*a*, 582*b* and 582*c*. The opening of the contacts 582*b* interrupts one holding circuit for the card relay 588, but this relay remains operated over the holding circuit provided by the closed contacts 167*a*. The opening of the contacts 582*c* interrupts the energizing circuit for the gate solenoid 152 and the solenoid 230 in the indexing drive assembly 44. Releasing the solenoid 230 permits the armature 232 (FIG. 2) thereof to move downwardly so that the idler roller 220 is lifted out of engagement with the card 37, thereby to prevent further advancement of the card 37 under the control of the wheel 168 and to free this card for ejection by the assembly 50. The release of the solenoid 152 releases the gate element 134 (FIG. 4) which moves downwardly into engagement with the upper surface of the card 37. However, the gate element 134 is not moved to a position capable of blocking the guideway 138 until such time as the card 37 is ejected.

The opening of the contacts 582*a* interrupts the holding circuit for the relay 580 so that this relay releases to open the contacts 580*a* and 580*b*. The opening of the contacts 580*a* interrupts the above described holding circuits for the groups of register relays 530, 540, 550, 560 and 570 so that the operated relays in these groups are restored to their normal condition to be capable of storing the next items of information provided by the sensing unit 36. The opening of the contacts 580*b* interrupts the holding circuit for the relay 584 so that this relay releases to aid in restoring the control circuit 39 to its normal condition.

The closure of the contacts 582*d* completes the energizing circuit for the ejection solenoid 344 so that this solenoid operates to retract its armature 346 (FIG. 2). The retraction of the armature 346 pivots the bracket 336 in a clockwise direction so that the idler roller 324 is biased into engagement with the perforated card 37 disposed between the roller 334 and the drive wheel 324. Biasing the card 37 into engagement with the wheel 324 renders this wheel effective to quickly eject the card 37 from the recorder unit 30. Incident to the ejection of the card 37, the gate element 134 is permitted to move fully downward to its interposing position to release the switch 167 so that the contacts 167*a* are opened to interrupt the last holding circuit for the card relay 588.

The card relay 588, in releasing, opens the contacts 588*a*—588*e*. The opening of the contacts 588*c* interrupts the energizing circuit for the motor 86. The opening of the remainder of the contacts controlled by the relay 588 merely aids in conditioning the control circuit 39 for an additional cycle of operation.

Referring back to the above described operation of the last column relay 582, the opening of the contacts 582*a* also interrupts the operating circuit for the clutch solenoid 204 so that this solenoid releases to again arrest movement of the control cam 180 and, accordingly, of the shaft 174 at the end of its current cycle of rotation. During this cycle of rotation, the wipers 250 and 252 are restored to their normal condition in engagement with the segment forming the first stepping position of the commutator 244. Further, during this continuing cycle of rotation of the shaft 174, the cam 323 opens the contacts 321*a* so that the above described operating circuit for the relay 582 is interrupted to release this relay so as to close the contacts 582*a*, 582*b* and 582*c* and to open the contacts 582*d*. In opening the contacts 582*d*, the energizing circuit for the solenoid 344 in the ejecting drive assembly 50 is interrupted so that the bracket 336 is pivoted in a counterclockwise direction to move the idler roller 334 out of engagement with the driven wheel 324, thereby rendering the ejecting drive assembly 50 ineffective. The remaining contact operations produced by the release of the relay 582 complete the restoration of the control circuit 39 to its normal condition in which it is capable of receiving the next card 37 to be perforated under the control of the next key 38 inserted into the sensing unit 36.

The control circuit 39 also includes means for preventing the continuing operation of the punching assembly 48 under the control of the commutator 244 if the date and time information has not been recorded on the card 37 prior to the time at which the timing circuit 34 is to be operated under the control of the cam 435 to advance the settings of the register switches therein. It is desirable to prevent operation of the punching assembly 48 during this interval inasmuch as the commutator 244 may connect the interposer solenoids 294 to the contact bank of one of the stepping switches in the timing circuit 34 during the time that the timing circuit is being adjusted and, accordingly, a false recording will be provided on the card 37. As set forth above, the speed of rotation of the connected cams 435—438 is slow enough that a cycle of operation of the commutator 244 will normally be completed in the interval in which the contacts 437*a* are maintained closed by the cam 437. However, since the operation of the relay 590 to initiate a cycle of recording operation of the recorder unit 30 may take place at any time during the cycle of rotation of the cams 435—438, the initial operation of the commutator 244 and of the punching assembly 48 may occur toward the end of the closed circuit period of the contacts 437*a*.

Accordingly, toward the end of the period during which the contacts 437*a* are closed, the cam 436 closes a pair of contacts 436*a* to prepare an operating circuit for a timing delay relay 594. If the wipers 250 and 252 of the commutator 244 have moved beyond the fifth stepping position of the commutator 244, the prepared operating circuit for the timing delay relay 594 is not completed. However, if the wipers are in engagement with contacts in the first, second, third, fourth or fifth stepping positions when the contacts 436*a* are closed, movement of the wiper 250 into engagement with the fifth segment of the commutator 244 and the subsequent closure of the contacts 321*a* completes an energizing circuit for the relay 594 simultaneously with supplying B+ potential to the translating network controlled by the storage relay group 570. The operation of the relay 594 opens the contacts 594*a* and closes a pair of contacts 594*b*. The closure of the contacts 594*b* completes a holding circuit for the relay 594. The opening of the contacts 594*a* interrupts the above described operating circuit for the relay 590 so that this relay releases to open contacts 590*c*, among others. The opening of the contacts 590*c* releases the clutch solenoid 204 so that the detent 194 again engages the shoulder 192 on the cam 180 so as to arrest further rotation of the control shaft 174 at the end of the current cycle of rotation in which the fifth employee designation digit is punched in the card 37, in which the contacts 321*a* are opened to interrupt the operating circuit for the relay 594 and in which the wiper 250 is moved into engagement with the segment forming the sixth stepping position of the commutator 244. The opening of the contacts 321*a* does not release the relay 594 due to the prior completion of the holding circuit therefor.

The continuing rotation of the cams 435—438 next causes the opening of the contacts 437*a* to interrupt a second point in the operating circuit for the punch relay 590 and to interrupt the holding circuit for the relay 594 so that this relay releases. The release of the relay 594 closes the contacts 594*a* and opens the contacts 594*b*. The opening of the contacts 594*b* interrupts an additional point in the holding circuit for the relay 594. The reclosure of the contacts 594*a* at this time does not again complete the operating circuit for the punch relay 590 inasmuch as the contacts 437*a* have been opened by the control cam 437.

The continuing rotation of the cams 435—438 next opens the contacts 436*a* and closes the contacts 435*a* and 438*a* so that the timing circuit 34 is advanced to the next setting representing instant time. Following the opening of the contacts 435*a* and 438*a* (FIG. 15), the cam 437 again closes the contacts 437*a* so that the punch relay 590 is operated. The operation of the punch relay 590 closes the contact 590*c*, among others, so that the clutch solenoid 204 is again energized to initiate rotation of the control shaft 174. Upon initiation of the rotation of the shaft 174, the cam 323 first closes the contacts 321*a* so that the interposer solenoids 294 are selectively operated in accordance with the value of the tens hours digit stored in the register switch 470 and, thereafter, this value is perforated in the card 37 and the commutator 244 is advanced to its next or seventh position. Since this cycle of operation of the punching assembly 48 is initiated at the beginning of the period during which the contacts 437*a* are closed, the cycle of recording operation is easily completed before the next period at which the timing circuit 34 is to be operated under the control of the cams 435 and 438. Thus, the control circuit 39 includes means for preventing the operation of the punching unit 48 during the interval in which the timing circuit 34 is being adjusted and for continuing an interrupted recording operation following the completion of the setting of the timing circuit 34.

In the above description of the operation of the recorder unit 30, the unit 30 is described as being adapted for use in conjunction with the keyboard assembly 608 which permits additional items of information to be recorded on the card 37 following the completion of the storage of the designation and time information. However, it should be understood that if the recorder unit is to provide only time and badge number information, the key set assembly 608 and the control relays 596, 598 and 600 associated therewith may be removed to provide full automatic operation under the control of the circuit 39. In the illustrative description set forth above, the operation of the recorder unit 30 is initiated by the insertion of the badge or key 38 into the sensing device 36 and the subsequent insertion of the card 37 into the recorder unit. However, the control circuit 39 interlocks the operation of the sensing device 36 and the switch 120 so that the operation of the recorder unit 30 can be initiated by the concurrent insertion of the badge 38 and the card 37 or by the insertion of the card 37 into the recorder unit 30 following the insertion of the key 38 into the sensing unit 36.

In summary, the recorder unit including the new and improved card punching and feeding means of the present invention provides easily controlled means for recording date and time entries on the record card 37 together with information indicating the designation or badge number of an employee. This card punching and feeding assembly includes the card feeding drive assembly 42 which advances at the inserted record card 37 into engagement with the gate assembly 46 in a position to be perforated by the punching assembly 48. Following the advance of the card 37 to this position, the gate assembly 46 and the card feeding drive assembly 42 are rendered ineffective, and the step-by-step or indexing drive assembly 44 is rendered effective to advance the card step-by-step in synchronism with the operation of the punching assembly 48 under the control of the signals supplied by the timing circuit 34 and the control circuit 39, the operation of the drive assembly 44 and the punching assembly 48 being synchronized with the step-by-step operation of the commutator 244 which supplies signals to the ten interposer solenoids in the punching assembly 48. Following the completion of the perforation of the card 37 by the assembly 48, the drive assembly 44 is rendered ineffective and the ejecting drive means 50 is placed in operation to eject the perforated card 37 from the recorder unit 30. The card punching and feeding assembly includes a minimum of parts, is small and compact in design, and is capable of economical fabrication.

Although the present invention has been described in conjunction with a single embodiment thereof, it is obvious that numerous other embodiments may be devised by those skilled in the art which will fall within the spirit and scope of the principles of this invention.

What is claimed and desired to be secured by Letters Patent in the United States is:

1. A recorder using a record card comprising structure defining a card guidway adapted to receive a card, a punch mechanism for recording data on a card passing through said guideway, a plurality of spaced drive wheels extending into said guideway at spaced points and adapted to engage a card to be advanced, drive means for driving said wheels, at least one of said wheels being driven continuously a plurality of pivotally supported idler wheels each extending into said guideway in alignment with one of said drive wheels, and control means sequentially pivoting each of said idlers toward the aligned drive wheel for rendering each of said drive wheels effective in sequence to advance a card through said guideway and relative to said punch mechanism.

2. The recorder set forth in claim 1 in which said drive means includes means for driving at least one other of said drive wheels in a step-by-step manner.

3. A punching apparatus for use with a record card comprising a base structure including means defining a card guideway, a punching assembly having a card receiving passageway and carried on said structure with said passageway in alignment with said guideway, a movably mounted gate element normally extending at least partially across said passageway in a card intercepting position, a first drive wheel extending into said guideway, a first idler wheel extending into said guideway in alignment with said first drive wheel, a first bracket pivotally mounted on said structure for rotatably supporting said first idler wheel, a first solenoid mounted on said structure and connected to said first bracket, switch means including an operator element extending into said guideway and adapted to be engaged by a record card inserted into said guideway for operating said switch means, means responsive to operation of said switch means for operating said first solenoid to move said first bracket so that said first idler wheel presses said card against said first drive wheel to advance said card into said passageway and into engagement with said gate element, movement of said card into engagement with said gate element releasing said switch means so that said first solenoid is released to move said first idler out of engagement with said card, a drive means for advancing said card step-by-step through said passageway relative to said punching assembly, means responsive to the release of said switch means for moving said gate element out of said card intercepting position to permit said card to be advanced through said passageway under the control of said drive means, means for operating said drive means in synchronism with selective operation of said punching assembly so that said card is advanced incident to each operation of said assembly to punch said card, and means for ejecting said card from said passageway.

4. A punching apparatus for use with a record card comprising a base structure including means defining a card guideway, a punch guide frame having a card receiving passageway and carried on said structure with said passageway in alignment with said guideway, a plurality of punch elements slidably mounted in said guide frame and extending transverse to said passageway, a first drive means extending into said guideway, switch means including an operator element extending into said guideway and adapted to be engaged by a record card inserted into said guideway for operating said switch means, means responsive to operation of said switch means for operating said first drive means to advance said card into said passageway, movement of said card into said passageway releasing said switch means so that said first drive means is rendered ineffective, a second drive means extending into said passageway to engage said card, means responsive to the release of said switch means for conditioning said second drive means for operation, a punch supporting frame movably mounted on said structure and slidably supporting said punch elements, a plurality of interposer elements carried on and movable relative to said punch supporting frame, first control means for selectively operating said interposer elements to block movement of selected ones of said punch elements relative to said punch supporting frame, a control shaft, first means controlled by said control shaft for reciprocating said punch supporting frame relative to said structure so that said punch elements enter said passageway and the blocked elements perforate said card, second means controlled by said control shaft for operating said conditioned second drive means incident to each reciprocation of said punch supporting frame, clutch means for controlling rotation of said control shaft to selectively render said first and second means effective, third drive means mounted on said structure in alignment with said passageway, and second control means for rendering said third drive means effective to eject said card from said passageway.

5. A punching apparatus for use with a record card comprising a base structure including means defining a card guideway, a punch guide frame having a card receiving passageway and carried on said structure with said passageway in alignment with said guideway, a plurality of punch elements slidably mounted in said guide frame and extending transverse to said passageway, a gate element movably mounted on said guide frame and normally extending at least partially across said passageway in a card intercepting position, a first continuously rotating drive wheel extending into said guideway, a first idler wheel extending into said guideway in alignment with said first drive wheel, a first bracket pivotally mounted on said structure for rotatably supporting said first idler wheel, a first solenoid mounted on said structure and connected to said first bracket, switch means including an operator element extending into said guideway and adapted to be engaged by a record card inserted into said guideway for operating said switch means, means responsive to operation of said switch means for operating said first solenoid to move said first bracket so that said first idler wheel presses said card against said first drive wheel to advance said card into said passageway and into engagement with said gate element, movement of said card into engagement with said gate element releasing said switch means so that said first solenoid is released to move said first idler out of engagement with said card, a second drive wheel extending into said passageway to engage said card, a second idler wheel extending into said passageway in alignment with said second drive wheel, a second bracket pivotally mounted on said structure and rotatably supporting said second idler wheel, a second solenoid mounted on said structure and connected to said second bracket, means controlled by the release of said switch means for operating said second solenoid to move said second bracket so that said second idler wheel biases said card against said second drive wheel, first control means for moving said gate element out of said card intercepting position to permit said card to be advanced through said passageway under the control of said second drive wheel, a punch supporting frame movably mounted on said structure and slidably supporting said punch elements, a plurality of interposer elements carried on and movable relative to said punch supporting frame, second control means for selectively operating said interposer elements to block movement of selected ones of said punch elements relative to said punch supporting frame, a control shaft, first drive means controlled by said control shaft for reciprocating said punch supporting frame relative to said structure so that said punch elements enter said passageway and the blocked elements perforate said card, second drive means controlled by said control shaft for advancing said second drive wheel incident to each reciprocation of said punch supporting frame, clutch means for controlling rotation of said control shaft to selectively render said first and secnd drive means effective, a third continuously rotating drive wheel mounted on said structure in alignment with said passageway, a third idler wheel aligned with said third drive wheel, a third bracket pivotally mounted on said structure for rotatably supporting said third idler wheel, a third solenoid mounted on said structure and connected to said third bracket, third control means for operating said third solenoid to shift said third bracket so that said third idler wheel presses said card against said third drive wheel to eject said card from said passageway, and means responsive to ejection of said card from said passageway for releasing said third solenoid.

6. A recording apparatus for use with a record medium comprising a frame, a plurality of punch elements movably mounted on said frame, interposer means for blocking selected ones of said punch elements against movement relative to said frame, an index wheel for advancing spaced portions of said record medium into alignment with said punch elements, a control shaft, cam means on said control shaft for moving said frame toward and away from said medium during each cycle of rotation of said control shaft, means drivingly connecting said index wheel to said control shaft to rotate said index wheel through a selected increment of angular movement during each cycle of rotation of said control shaft, a prime mover, clutch means disposed between said prime mover and said control shaft for selectively rendering said prime mover effective to rotate said control shaft, switch means operated incident to each cycle of rotation of said control shaft, and a control circuit including said switch means for selectively operating said interposer means.

7. A recorder using a record medium comprising a die member having a plurality of aligned openings, a frame movable relative to said die member, a plurality of punch elements movably mounted on said frame by a lost motion connection, said punch elements being in alignment with said openings, each of said punch elements having a projecting portion, a plurality of interposer elements movably mounted on said frame, each of said elements being disposed adjacent one of said projecting portions, a plurality of solenoids mounted on said frame, each of said solenoids being effective to selectively move one of said interposer elements into alignment with the projecting portion on one of said punch elements to prevent movement of said one punch element relative to said frame through said lost motion connection, means including both a drive wheel rotated in synchronism with the movement of said frame and an idler wheel selectively movable toward and away from said drive wheel for feeding a record medium between said die member and said punch elements, and means for moving said frame toward said die member so that the punch elements having a projecting portion aligned with an interposer element is effective to perforate said record medium while the remaining punch elements move relative to said frame.

8. A recorder using a record card having a predetermined length comprising a punching guideway in alignment with said opening, a continuously drive wheel extending into said guideway and adapted to engaged a record card, an idler wheel pivotally mounted on said structure and aligned with said drive wheel, solenoid means for moving said idler wheel toward said drive wheel to bias said card against said drive wheel to render said drive wheel effective to advance said card through said guideway into said card receiving opening, switch means including operating means extending into said guideway and responsive to the insertion of a card into said guideway for selectively actuating said switch means to control operation of said solenoid, a gate element extending into said card receiving opening and spaced along said guideway from said operating means a distance substantially equal to the predetermined length of a record card to limit movement of said card relative to said punching unit by said drive wheel, and means including said switch means for moving said gate element out of said card receiving opening.

References Cited in the file of this patent

UNITED STATES PATENTS

| | | |
|---|---|---|
| 1,241,268 | Payne | Sept. 25, 1917 |
| 1,293,356 | Damm | Feb. 4, 1919 |
| 1,608,837 | Bryce | Nov. 30, 1926 |
| 1,944,671 | Schaaff | Jan. 23, 1934 |
| 2,168,763 | Daly et al. | Aug. 8, 1939 |
| 2,362,037 | Watson | Nov. 7, 1944 |
| 2,451,752 | Lake et al. | Oct. 19, 1948 |
| 2,791,425 | Ford et al. | May 7, 1957 |
| 2,797,095 | Grapes et al. | June 25, 1957 |
| 2,837,279 | Dickinson et al. | June 3, 1958 |
| 2,838,361 | Findlay et al. | June 10, 1958 |
| 2,880,932 | Davis et al. | Apr. 7, 1959 |